(12) United States Patent
Yoshizawa et al.

(10) Patent No.: US 11,341,940 B2
(45) Date of Patent: May 24, 2022

(54) HEAD MOUNTED DISPLAY AND SETTING METHOD

(71) Applicant: MAXELL, LTD., Kyoto (JP)

(72) Inventors: Kazuhiko Yoshizawa, Kyoto (JP); Yasunobu Hashimoto, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 17/257,033

(22) PCT Filed: Jul. 4, 2018

(86) PCT No.: PCT/JP2018/025354
§ 371 (c)(1),
(2) Date: Dec. 30, 2020

(87) PCT Pub. No.: WO2020/008559
PCT Pub. Date: Jan. 9, 2020

(65) Prior Publication Data
US 2021/0158784 A1  May 27, 2021

(51) Int. Cl.
*G09G 5/38* (2006.01)
*G06T 7/70* (2017.01)
*G06F 3/01* (2006.01)
*G06F 1/16* (2006.01)

(52) U.S. Cl.
CPC ............... *G09G 5/38* (2013.01); *G06F 3/012* (2013.01); *G06F 3/013* (2013.01); *G06F 3/017* (2013.01); *G06T 7/70* (2017.01); *G06F 1/163* (2013.01); *G06T 2207/30201* (2013.01); (Continued)

(58) Field of Classification Search
CPC .............. G09G 5/38; G09G 2320/08; G09G 2340/0464; G09G 2354/00; G09G 5/14; G09G 3/002; G09G 2340/045; G06T 7/70; G06T 2207/30201; G06F 3/013; G06F 1/163; G06F 3/012; G06F 3/017; G06F 3/0481; G06F 3/147; G06F 3/011
See application file for complete search history.

(56) References Cited

U.S. PATENT DOCUMENTS

2014/0191942 A1*  7/2014  Kobayashi ........... G02B 27/017
                                                              345/156
2015/0058795 A1   2/2015  Koarai
(Continued)

FOREIGN PATENT DOCUMENTS

JP  2015-043135 A   3/2015
JP  2018-084886 A   5/2018

OTHER PUBLICATIONS

International Search Report of PCT/JP2018/025354 dated Aug. 7, 2018.

*Primary Examiner* — Abbas I Abdulselam
(74) *Attorney, Agent, or Firm* — Mattingly & Malur, PC

(57) ABSTRACT

In a head mounted display 100, a memory 71 stores an application. An image pickup unit 74 takes an image of a site of a user 1, and a position specifying unit 73 specifies a position and a direction of the head mounted display 100. A detector 75 detects a position indicated by the user 1 on the basis of the image taken by the image pickup unit 74, and a setting unit 76 sets a position indicating a home position on the basis of a result detected by the detector 75 and the position and the direction specified by the position specifying unit 73.

8 Claims, 22 Drawing Sheets

(52) U.S. Cl.
CPC . *G09G 2320/08* (2013.01); *G09G 2340/0464* (2013.01); *G09G 2354/00* (2013.01)

(56) References Cited

U.S. PATENT DOCUMENTS

2016/0252729 A1\* 9/2016 Doucet ................ A63F 13/95
  345/8
2018/0061003 A1\* 3/2018 Kono ..................... G06T 15/20

\* cited by examiner

FIG. 1
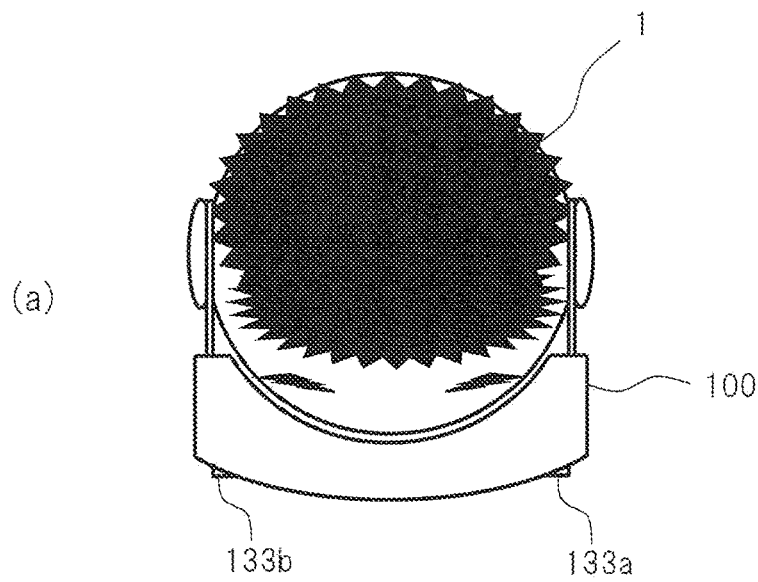
(a)
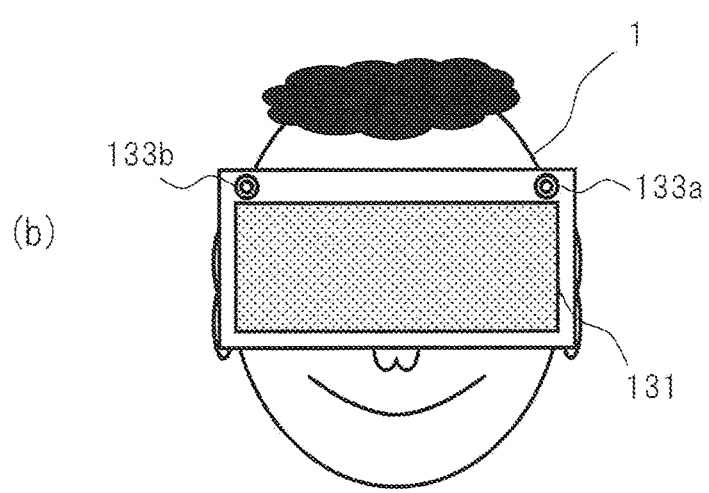
(b)
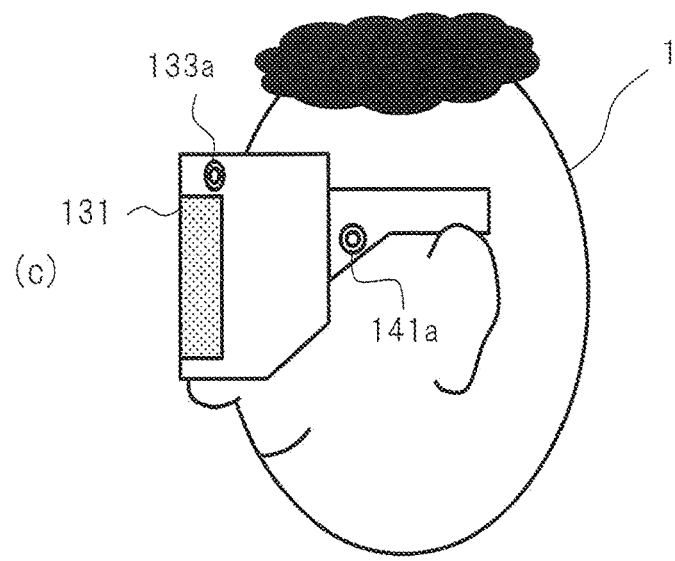
(c)

FIG. 6
(a)
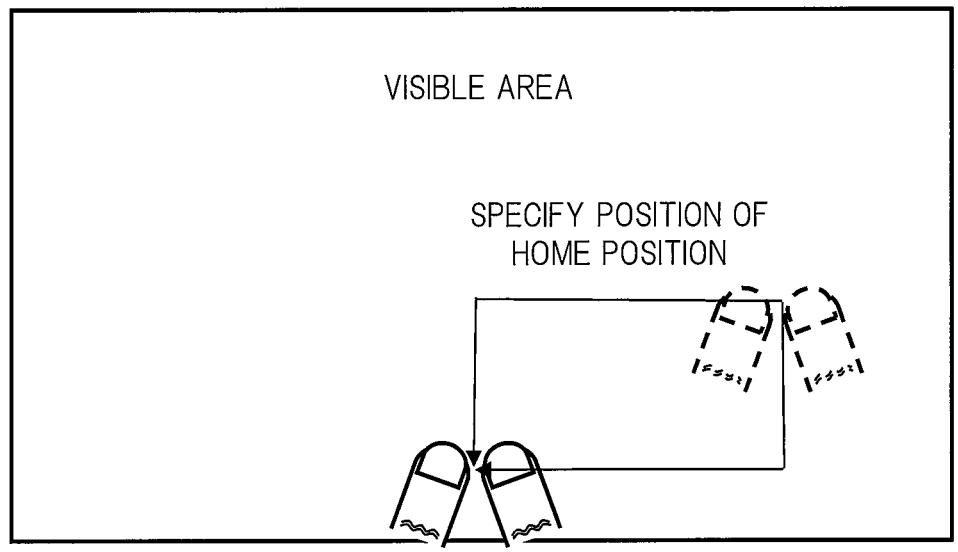
(b)
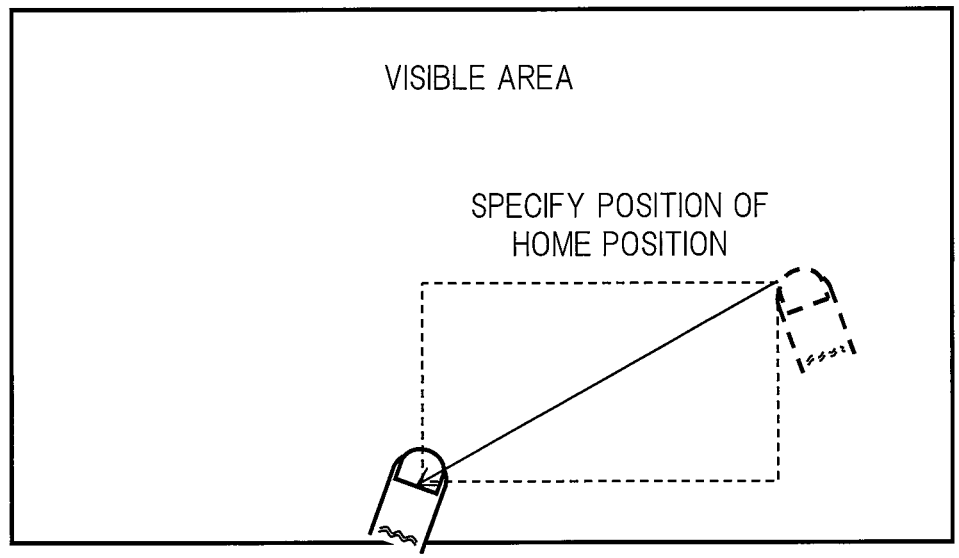

FIG. 7
(a) 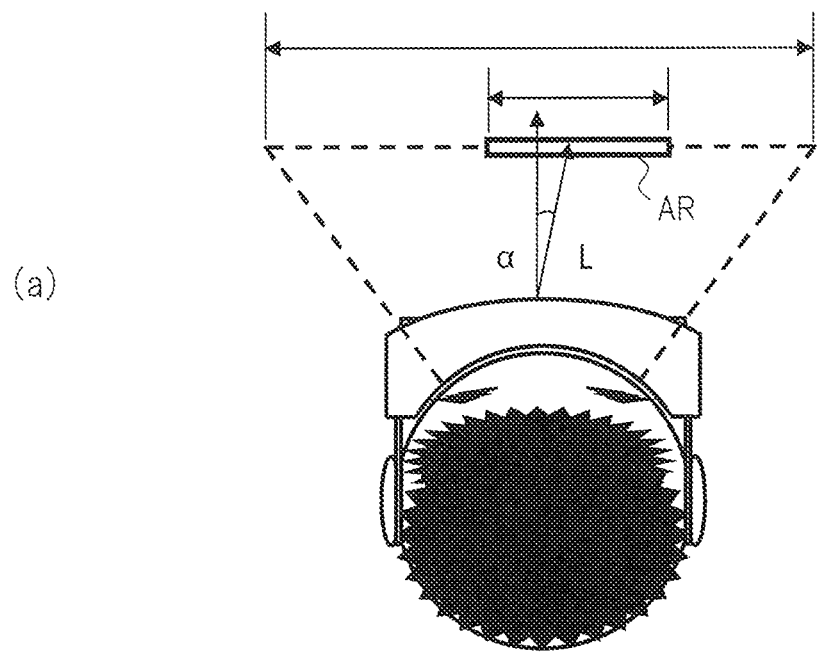
(b) 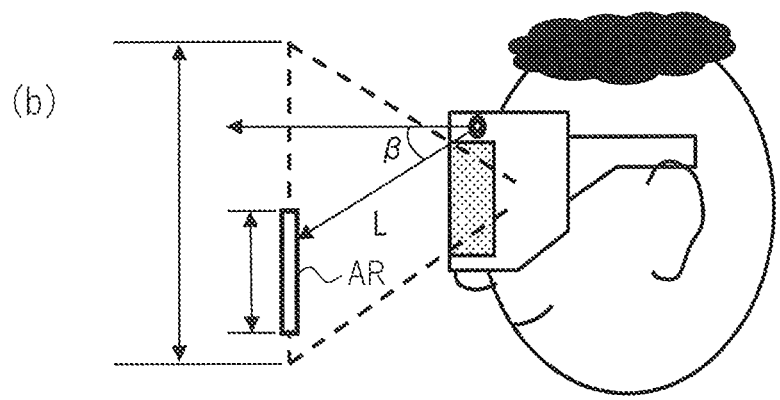

FIG. 9
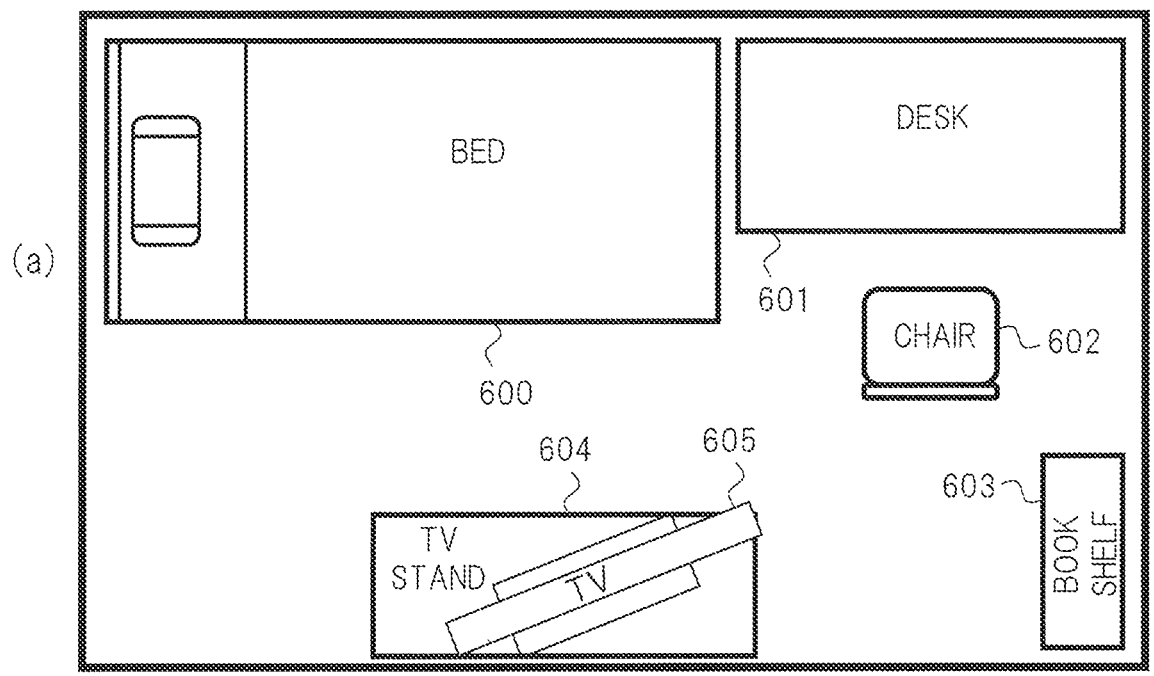
(a)
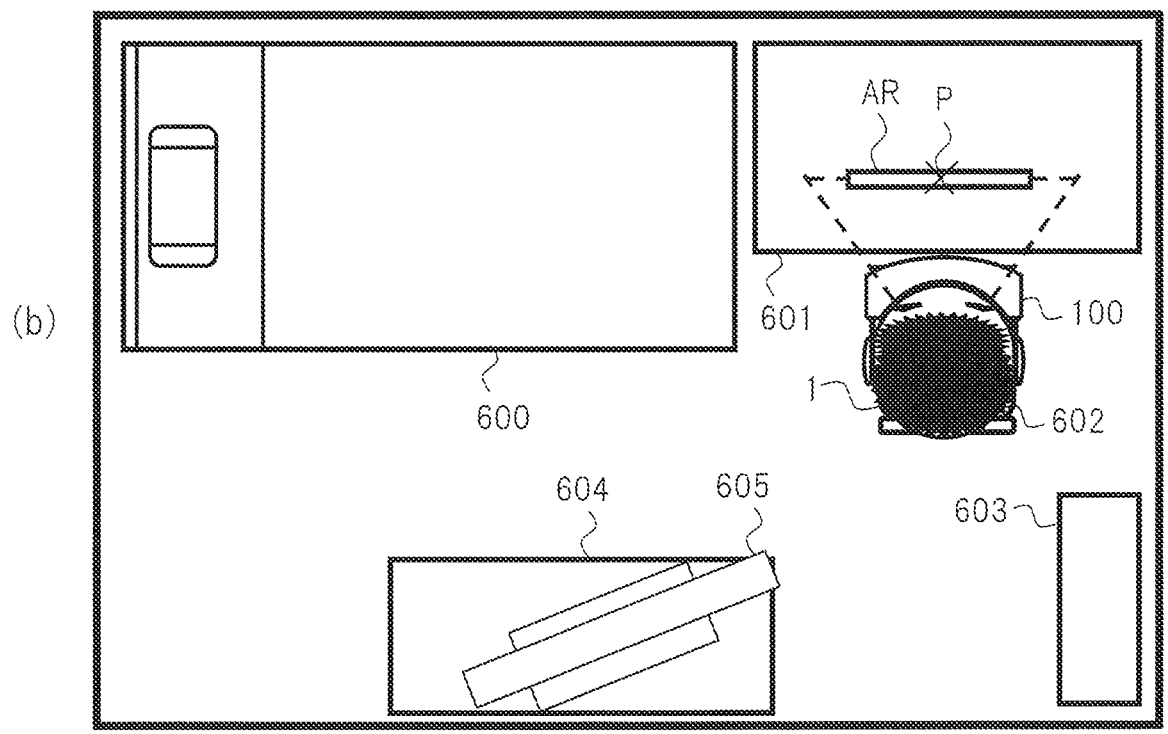
(b)

FIG. 10
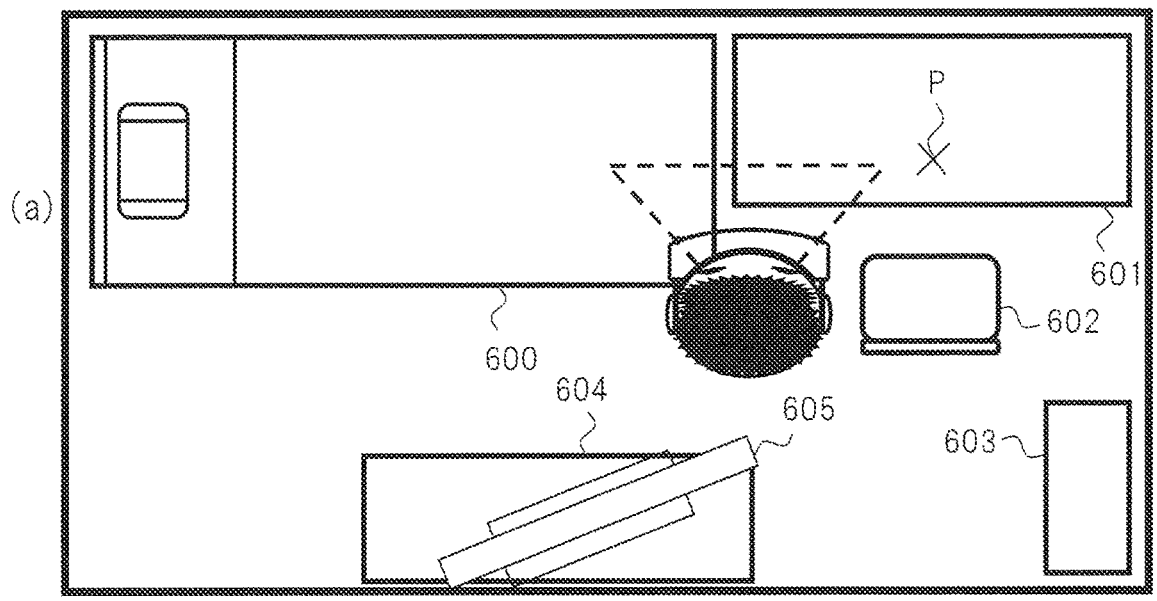
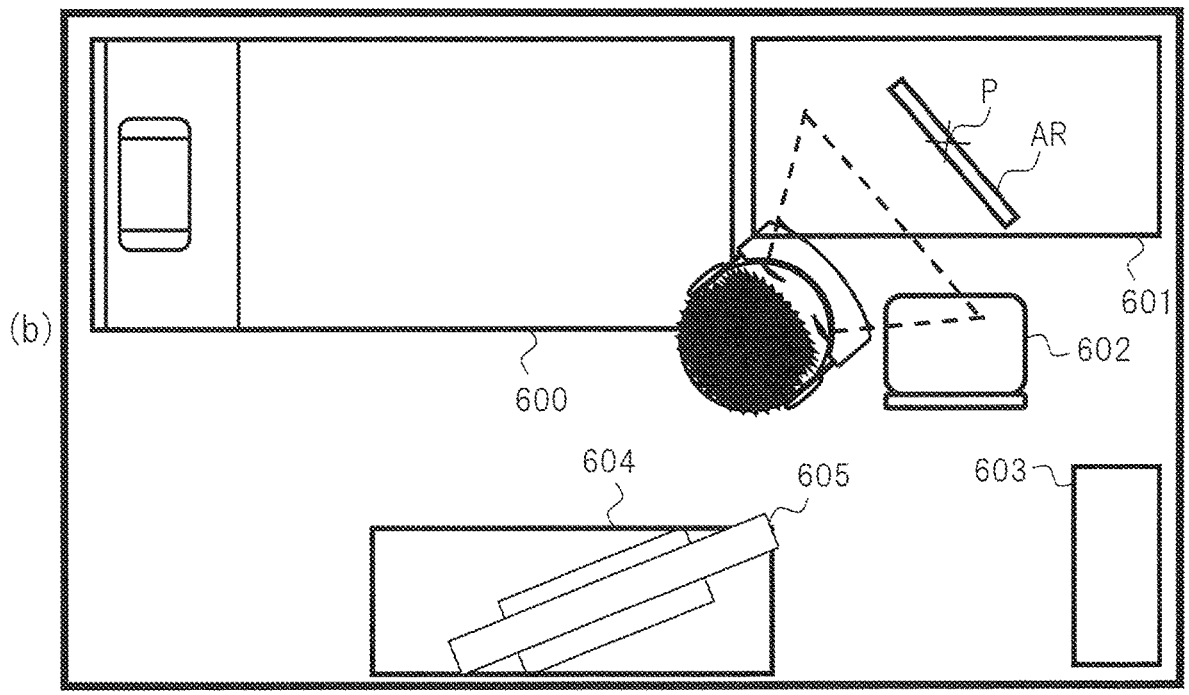

FIG. 12
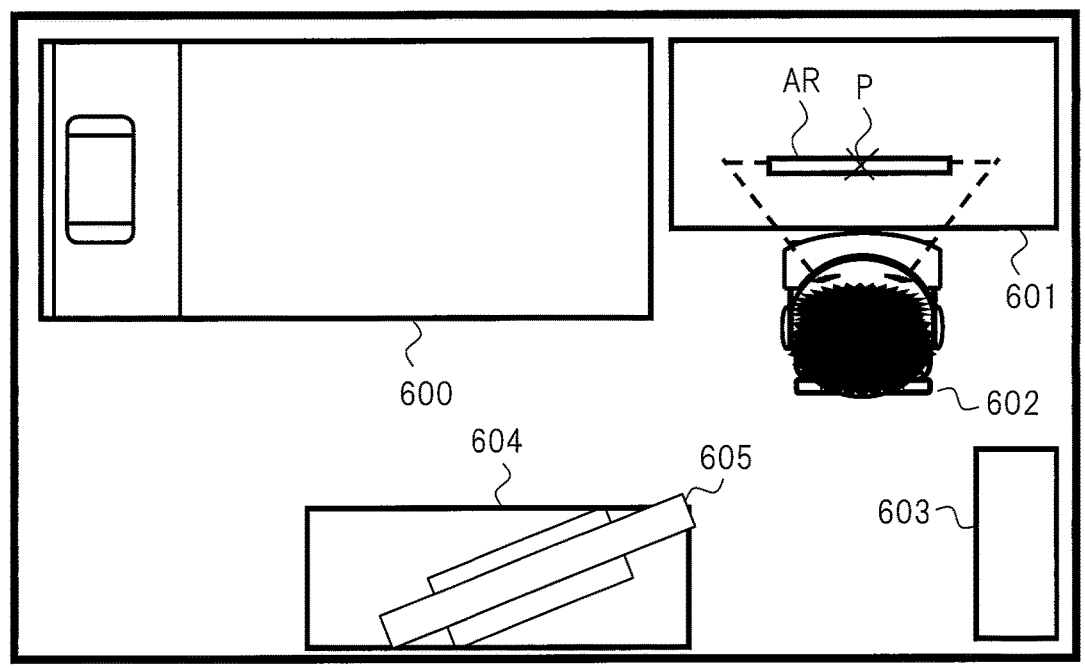
(a)
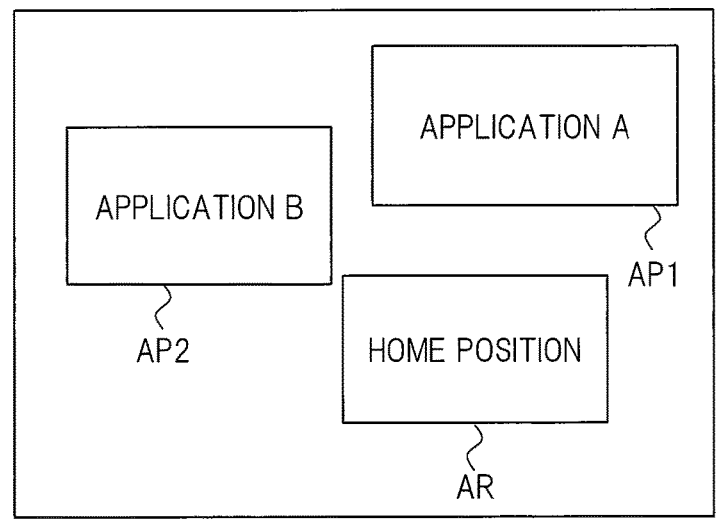
(b)

FIG. 13
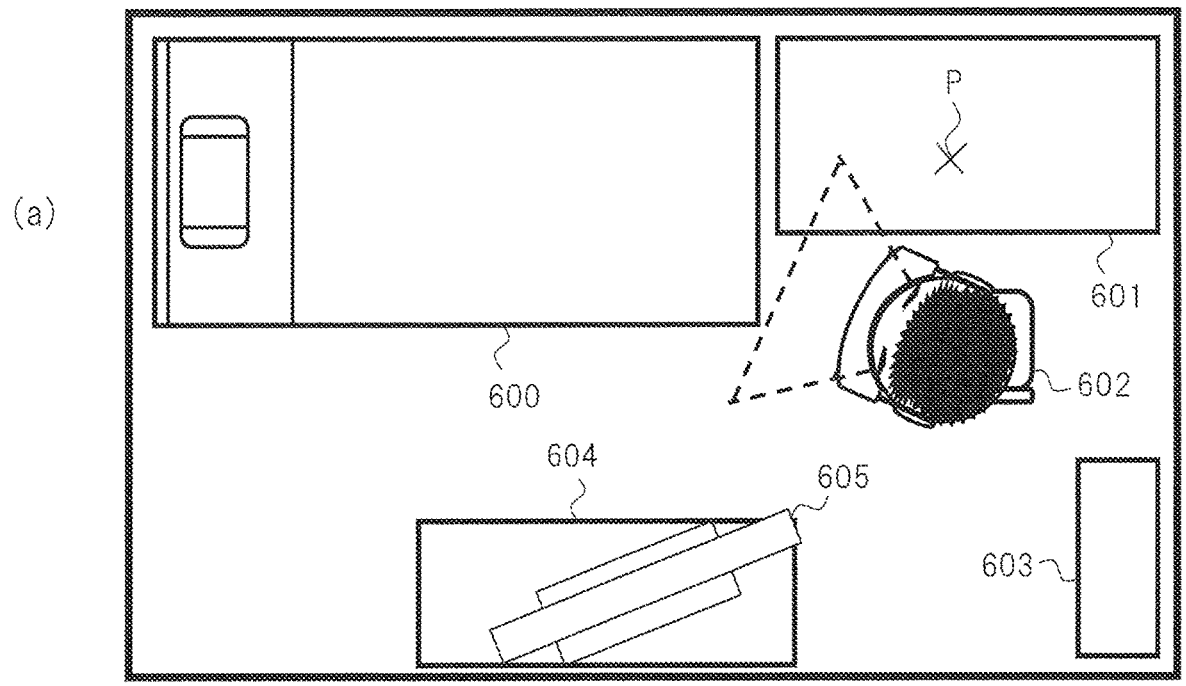
(a)
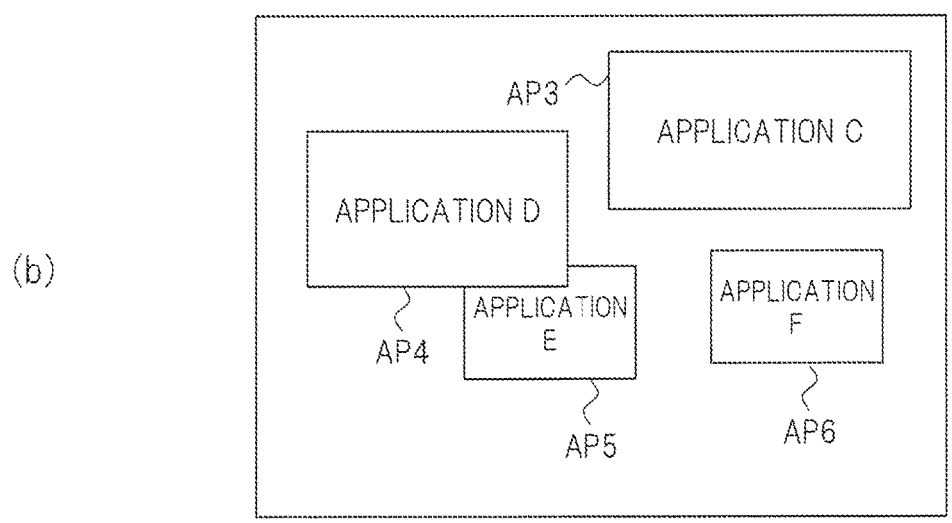
(b)

FIG. 15
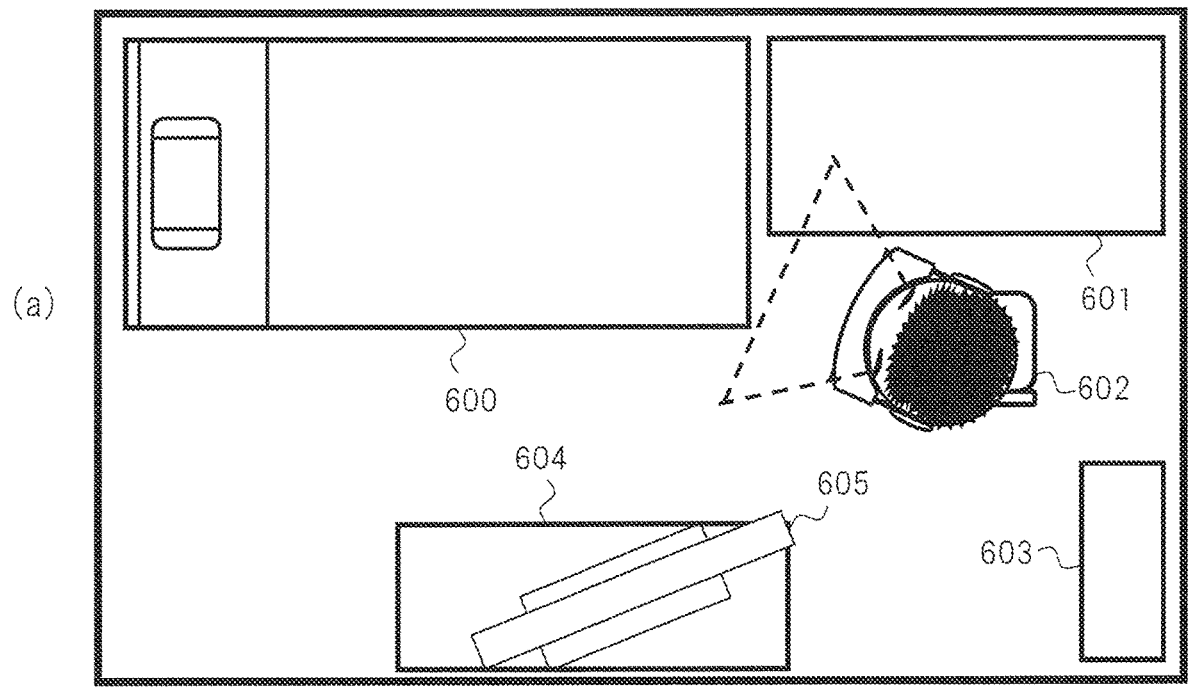
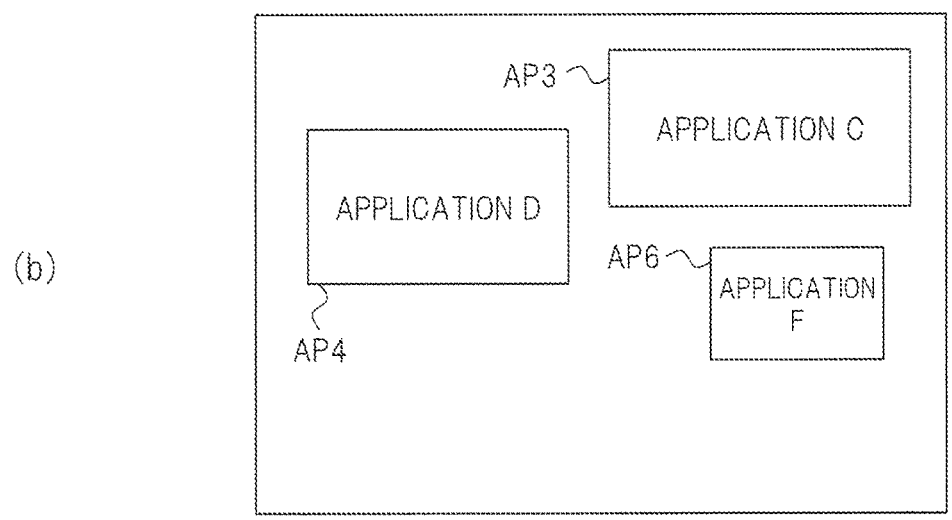

FIG. 16
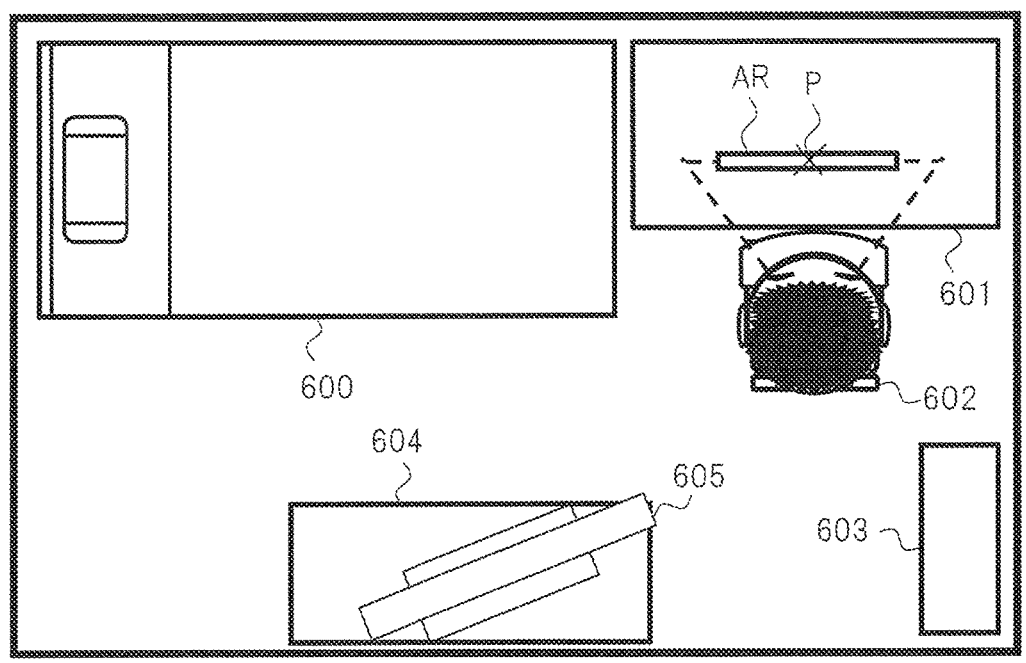
(a)
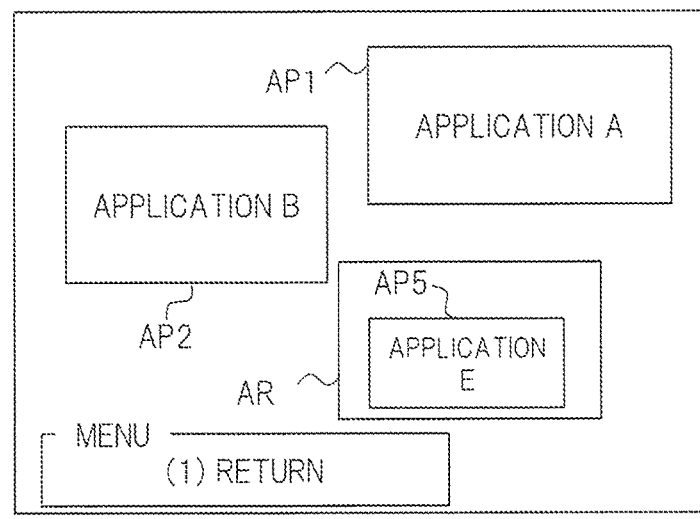
(b)

FIG. 17
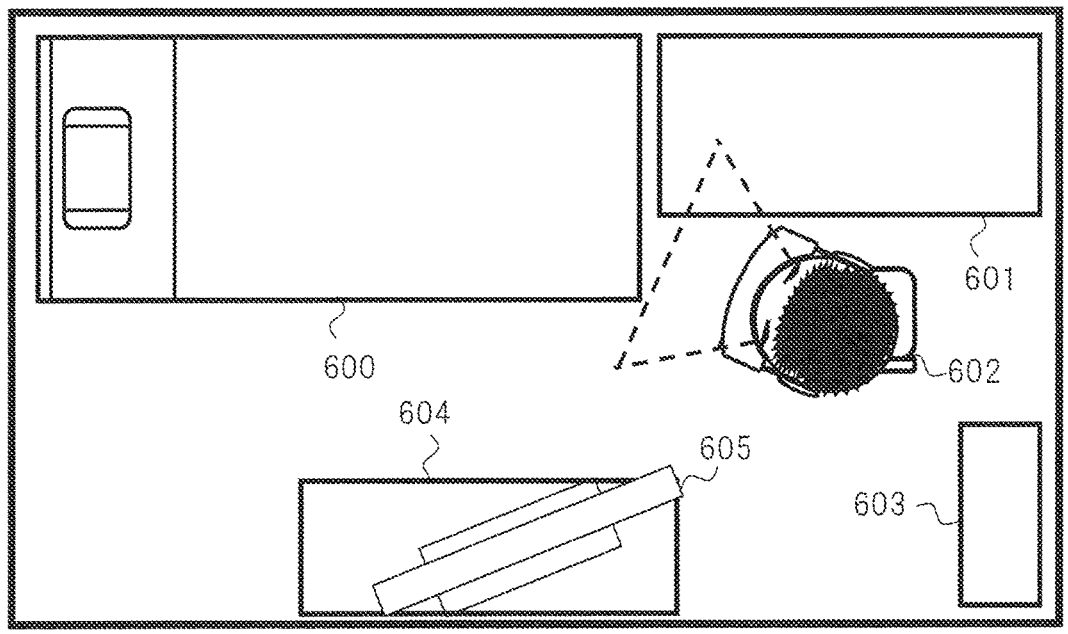
(a)
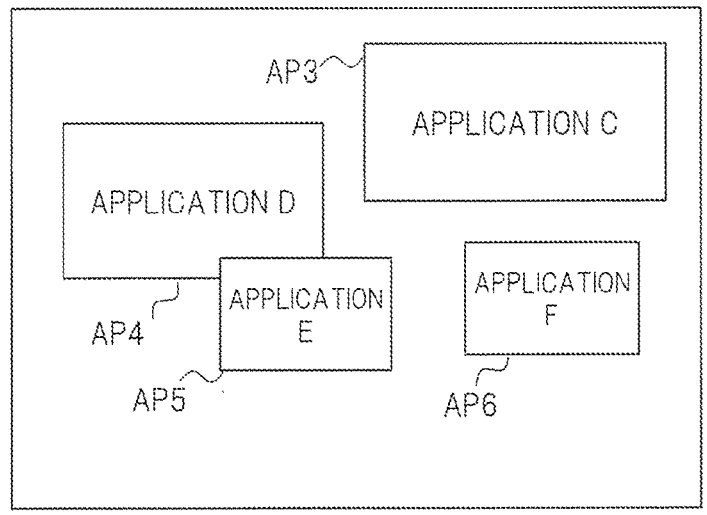
(b)

FIG. 19
(a) 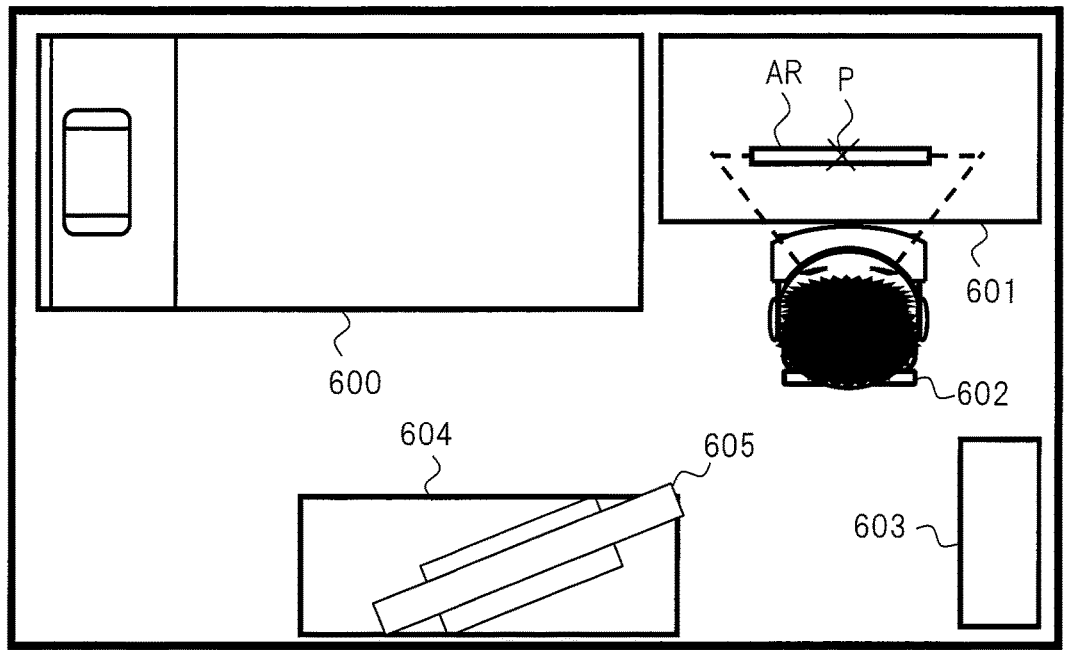
(b) 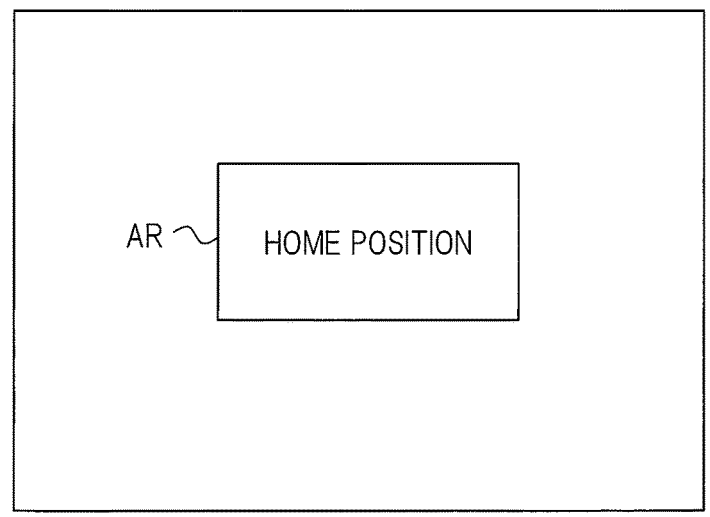

FIG. 20
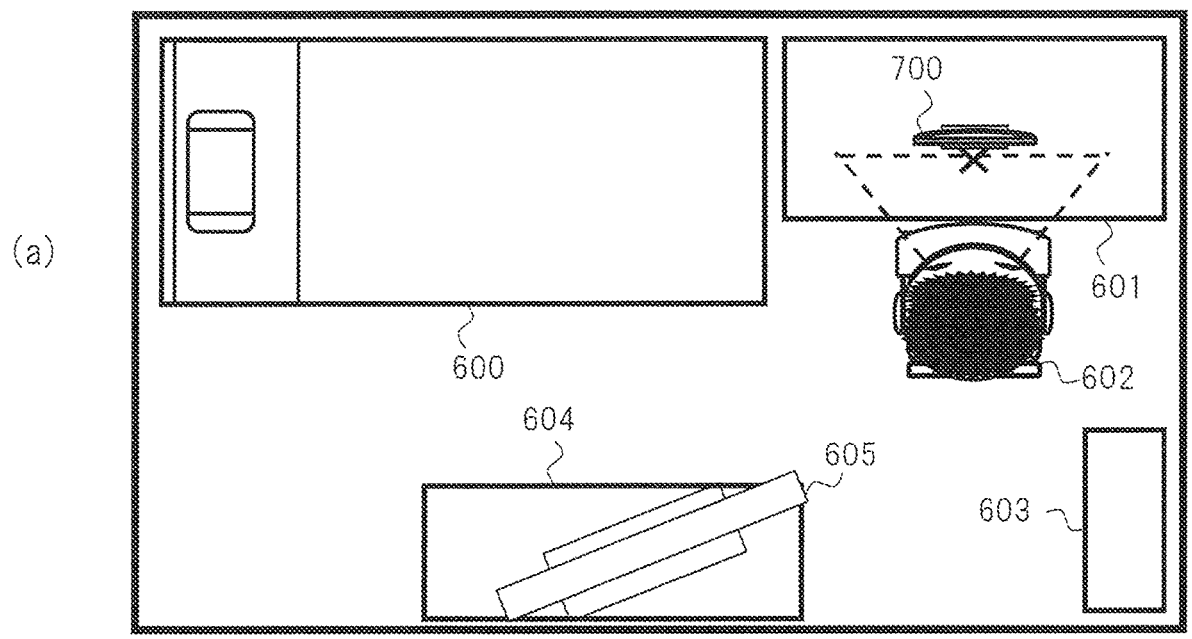
(a)
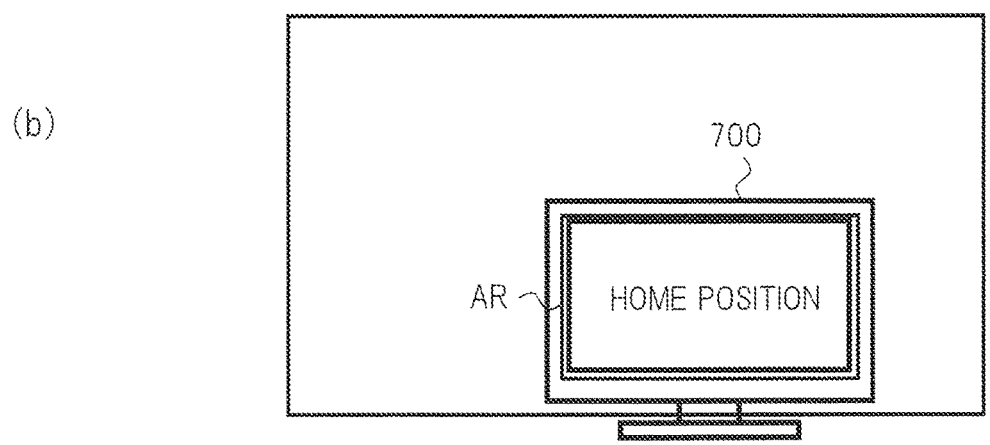
(b)

HEAD MOUNTED DISPLAY AND SETTING METHOD

TECHNICAL FIELD

The present invention relates to a head mounted display and a setting method.

BACKGROUND ART

There is a technique for displaying a plurality of windows on a display of an information processing apparatus and switching the windows in response to an operational input (for example, Patent document 1).

RELATED ART DOCUMENTS

Patent Documents

Patent document 1: Japanese Patent Application Publication No. 2015-43135

SUMMARY OF THE INVENTION

Problems to be Solved by the Invention

In the technique disclosed in Patent document 1 described above, the windows whose positions are fixed and that are displayed on the display of the information processing apparatus are controlled.

Here, a head mounted display in which an absolute coordinate for displaying an application (or a window in which the application is displayed) is defined is supposed. In this case, when a user operates the application, it may be necessary for the user to move in accordance with a position associated with an application to be used. As a result, the operation may become complicated.

It is an object of the present invention to provide a head mounted display by which an application can be operated easily.

The foregoing and other objects, and new features of the present invention will become more apparent from the detailed description of the present specification and the appending drawings.

Means for Solving the Problem

Techniques described in the claims are used as means for solving the problem.

In one example, there is provided a head mounted display storing an application. The head mounted display includes: an image pickup unit configured to take an image of a site of a user who wears the head mounted display; a detector configured to detect a position indicated by the user on a basis of the image taken by the image pickup unit; a position specifying unit configured to specify a position and a direction of the head mounted display; and a setting unit configured to set information regarding an operation area on a basis of a result detected by the detector and the position and the direction specified by the position specifying unit, the operation area being an area where the user operates the application.

Effects of the Invention

By using the technique of the present invention, it is possible to operate an application easily.

BRIEF DESCRIPTIONS OF THE DRAWINGS

FIG. 1 is a view illustrating an overview of a head mounted display according to the present embodiment;

FIG. 6 is a view for explaining another method of specifying a home position;

FIG. 7 is a view for explaining a method of calculating a distance from the head mounted display to the home position;

FIG. 9 is a view for explaining a state where the home position is set in the head mounted display worn by a user;

FIG. 10 is a view for explaining a display control of the home position;

FIG. 12 is a view for explaining a display example of the home position when the home position is set;

FIG. 13 is a view illustrating an example in a case where the head mounted display faces a direction different from the home position;

FIG. 15 is a view for explaining a state after "call" is selected in a menu;

FIG. 16 is a view for explaining a case where the user faces a direction at which the home position is located;

FIG. 17 is a view for explaining a case where the user faces a left direction again;

FIG. 19 is a view for explaining an example in which the home position is set;

FIG. 20 is a view for explaining an example a monitor is reset as a home position in a case where the monitor is arranged at a position of the home position;

DETAILED DESCRIPTION OF EMBODIMENTS

Figure 2:
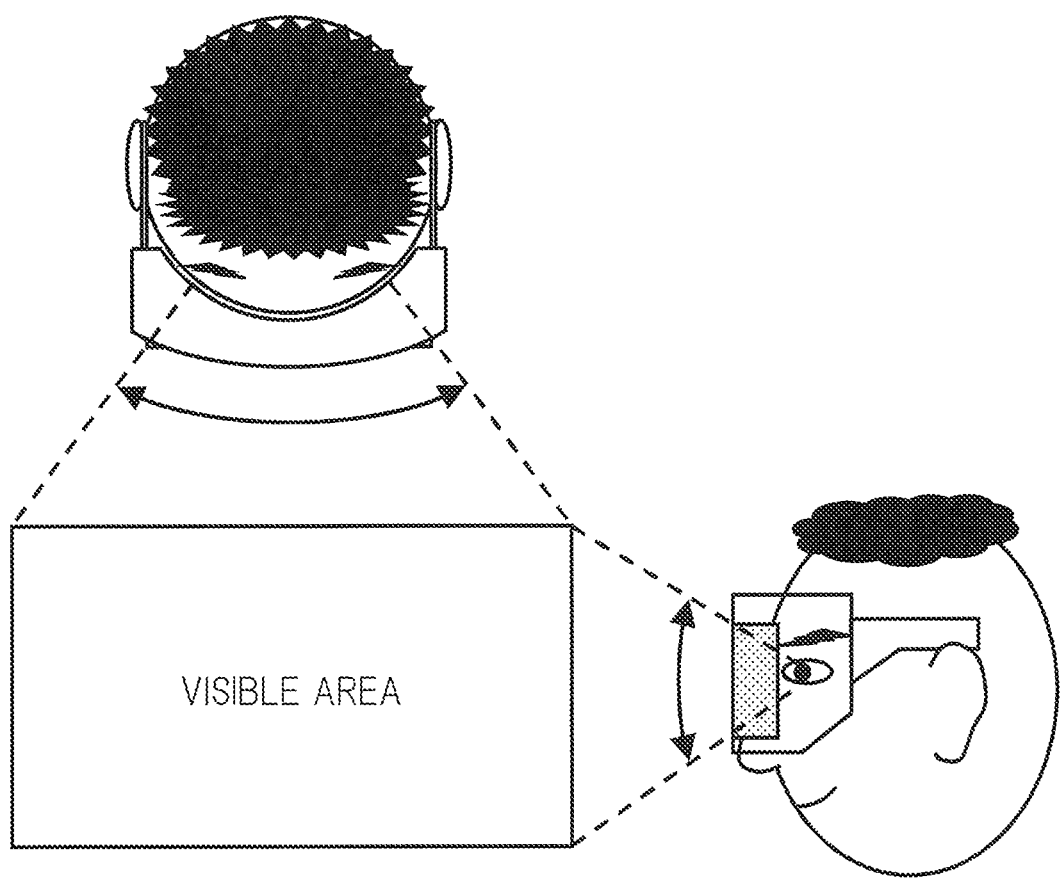
FIG. 2 is a view for explaining a visible area.

Hereinafter, an example of an embodiment of the present invention will be described with reference to the drawings.

An outline of a head mounted display according to the present embodiment will be described with reference to FIG. 1 (including FIG. 1(*a*) to FIG. 1(*c*)). FIG. 1 is a view illustrating an overview of the head mounted display 100. Specifically, FIG. 1(*a*) is a top view of the head mounted display 100 in a state where a user 1 wears the head mounted display 100. FIG. 1(*b*) is a front view of the head mounted display 100. FIG. 1(*c*) is a side view of the head mounted display 100.

The head mounted display 100 is an apparatus that displays an application, which the user 1 can visually recognize, and executes the application in a state where the user 1 is wearing the head mounted display 100 on his or her head. The head mounted display 100 includes a first image pickup unit 133a and a first image pickup unit 133b each of which can take an image of an external world. Further, the head mounted display 100 includes a see-through display 131 that is a transmission type of display. Further, as illustrated in FIG. 1(c), the head mounted display 100 has an audio output unit 141 (for example, an audio output unit 141a). Note that a non-transmission type of display may be used in place of the see-through display 131. In this case, the head mounted display 100 displays a result of the taken image on the display.

The head mounted display 100 stores one application or a plurality of applications therein, and displays the application on the see-through display 131 by means of an operation instruction from the user 1. Note that the head mounted display 100 stores information indicating a position at which an application is to be displayed (for example, an absolute position coordinate), and displays the application on the basis of this information.

Subsequently, a visible area indicating an area that can be visually recognized by the user 1 will be described with reference to FIG. 2. FIG. 2 is a view for explaining the visible area. Here, the visible area means an angle range that the user 1 can visually recognize through the see-through display 131. Which area of the external world this visible area corresponds to is determined on the basis of which direction the head mounted display 100 faces with respect to the external world. The user 1 changes a direction of his or her head, whereby the user 1 can visually recognize an arbitrary direction in the visible area. Moreover, the head mounted display 100 arranges virtual objects (for example, a display screen, an operation screen, and the like of the application displayed on the see-through display 131 described above) in a virtual space that is superimposed on a space around the user 1 in the external world and spreads. This makes it possible for the user 1 to visually recognize the virtual object. Further, the user 1 carries out a predetermined operational input against the head mounted display 100, whereby the user 1 can operate the virtual object. The virtual objects are visually recognized so as to be respectively arranged at specific positions of the external world. Note that in a case where a non-transmission type of display is used, an area of the image taken by the first image pickup unit 133 becomes a visible area.

As described above, the head mounted display 100 executes the application stored by the head mounted display 100. The head mounted display 100 according to the present embodiment sets an operation area (hereinafter, referred to also as a "home position") that is an area where the user 1 operates the application (for example, an operation for an editing process). Here, positions of the applications and the home position are fixed with respect to the external world.

Figure 3:
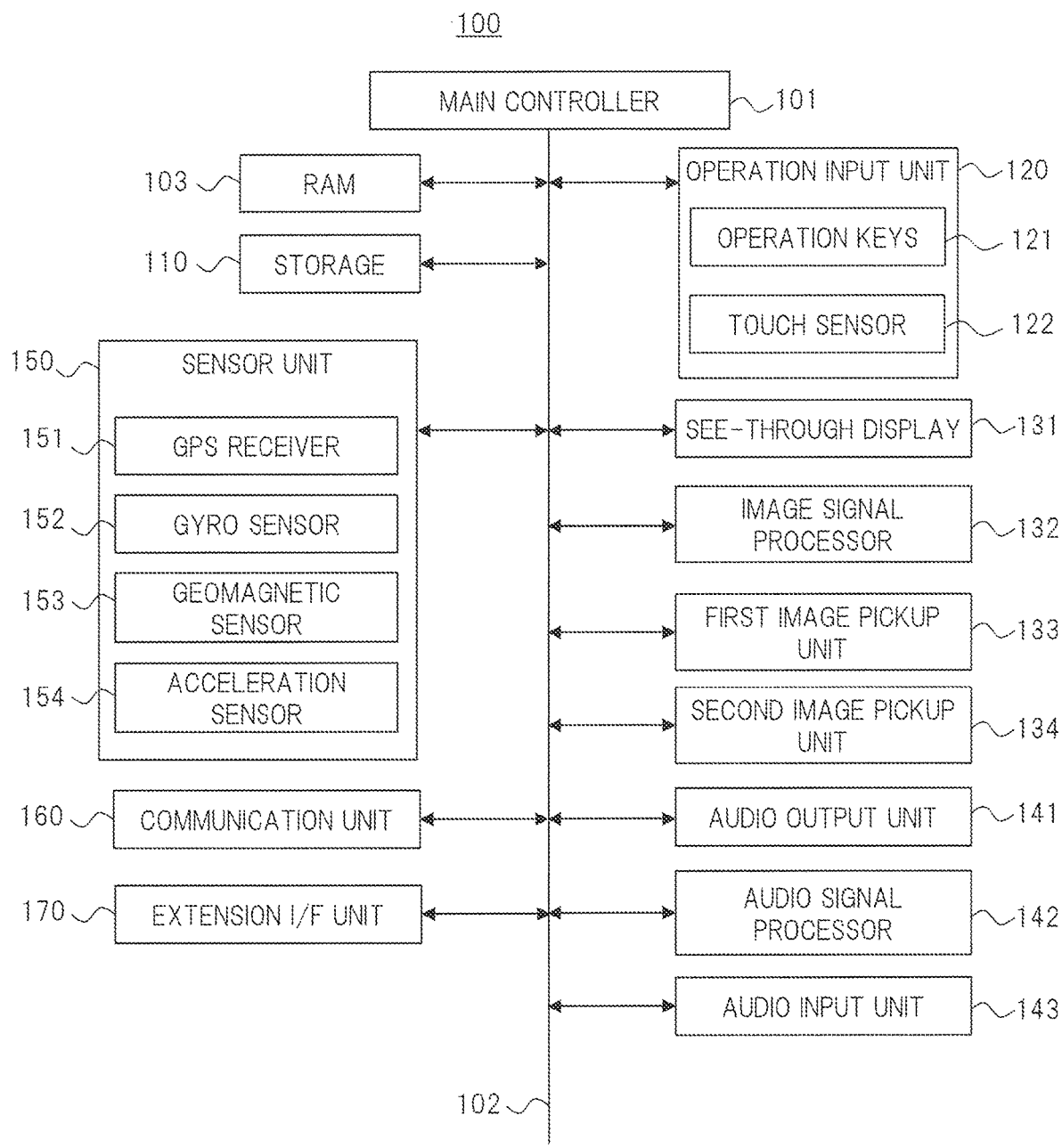
FIG. 3 is a view for explaining a hardware configuration of the head mounted display.

Subsequently, a hardware configuration of the head mounted display 100 will be described with reference to FIG. 3. FIG. 3 is a view for explaining a hardware configuration of the head mounted display 100. The head mounted display 100 includes a main controller 101 to control various kinds of devices via a bus 102. This main controller 101 is a CPU (Central Processing Unit) or the like. Further, the head mounted display 100 includes a RAM 103, a storage 110, a sensor unit 150, a communication unit 160, and an extension I/F unit 170. The sensor unit 150 includes a GPS receiver 151, a gyro sensor 152, a geomagnetic sensor 153, and an acceleration sensor 154.

Further, the head mounted display 100 includes an operation input unit 120, the see-through display 131, an image signal processor 132, the first image pickup unit 133, the second image pickup unit 134, the audio output unit 141, an audio signal processor 142, and an audio input unit 143. The operation input unit 120 has operation keys 121 and a touch sensor 122. The components described above operate, whereby functions of the head mounted display 100 (will be described later) are exerted.

The main controller 101 is an arithmetic processing apparatus that execute various kinds of information processing programs stored in the storage 110 to execute various kinds of functions. The RAM 103 becomes a work area at the time of execution of the various kinds of programs. The storage 110 is a part configured to store images that the main controller 101 causes the first image pickup unit 133 or the second image pickup unit 134 to take and various kinds of information.

The sensor unit 150 is apart configured to obtain information for specifying a position and a direction of the head mounted display 100. The sensor unit 150 includes the GPS receiver 151, the gyro sensor 152, the geomagnetic sensor 153, and the acceleration sensor 154.

The GPS receiver 151 receives a GPS signal to obtain GPS information. The gyro sensor 152 has a function to detect a moving direction of the head mounted display 100, and obtains gyro information indicating angular velocity data accompanying a change in the direction of the head mounted display 100. The geomagnetic sensor 153 is one type of an orientation detector configured to detect an angle indicating absolute orientation of the head mounted display 100 on the basis of earth magnetism. As such an angle, for example, an azimuth angle can be cited. The acceleration sensor 154 has a function to detect at least one of an acceleration or an inclined angle of the head mounted display 100.

In this way, the sensor unit 150 can detect at least one of the position or the direction of the head mounted display 100.

The communication unit 160 is a part configured to execute wireless communication. For example, the communication unit 160 executes near field communication. The extension I/F unit 170 is an interface for connecting to peripheral devices.

The operation input unit 120 is a part configured to receive an operational input. The operation keys 121 are physical keys installed at a predetermined position of the head mounted display 100 (for example, a portion to be put on his or her ear of the user 1). The touch sensor 122 is an input sensor installed on the see-through display 131 or the like.

The see-through display 131 is a see-through type (or a transmission type) of display. The image signal processor 132 is a part configured to analyze the image by the first image pickup unit 133 or the second image pickup unit 134 to output an analysis result to the main controller 101 or the like.

The first image pickup unit 133 is a part configured to take an image of the external world. The second image pickup unit 134 is a part configured to take an image of an eye of the user 1. The audio output unit 141 is a speaker that outputs audio or the like. The audio signal processor 142 is apart configured to analyze the audio inputted from the audio input unit 143. The audio input unit 143 is a part configured to input audio (or voice) of the user 1, and is a microphone or the like.

Figure 4:
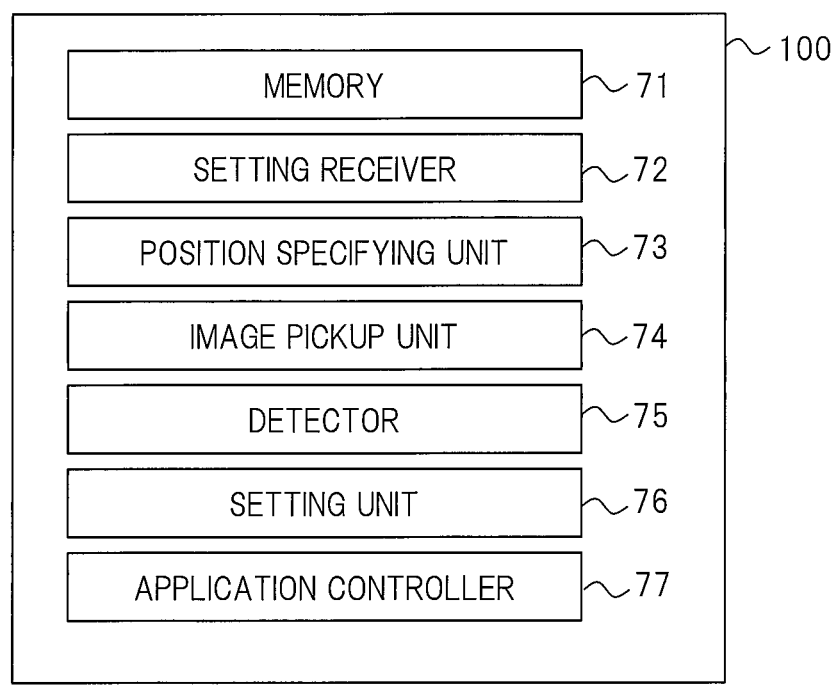
FIG. 4 is a functional block diagram of the head mounted display.

Subsequently, the functions of the head mounted display 100 will be described with reference to FIG. 4. FIG. 4 is a functional block diagram of the head mounted display 100.

The head mounted display 100 includes a memory 71, a setting receiver 72, a position specifying unit 73, an image pickup unit 74, a detector 75, a setting unit 76, and an application controller 77 (appli controller).

The memory 71 is a part configured to store various kinds of information. For example, the memory 71 stores a plurality of applications therein. Further, the memory 71 may store therein image data taken by the image pickup unit 74.

The setting receiver 72 is a part configured to receive an operation area setting request in response to an operation of the user 1 indicating a setting request. When the setting receiver 72 receives an operation area setting request, the setting receiver 72 notifies the position specifying unit 73, the image pickup unit 74, and the detector 75 of a fact that the operation area setting request is received. When the setting receiver 72 receives the operation area setting request, the head mounted display 100 shifts to a home position setting mode. The home position setting mode means a mode for setting the home position.

Note that instead of receiving an operation by the user 1 indicating the setting request, the setting receiver 72 may receive an operation area setting request from a controller (for example, the main controller 101) of the head mounted display 100 in a case where any operation area is not set at the time of turning on a power source of the head mounted display 100.

Further, the setting receiver 72 is a part configured to receive an operation area using request in response to an operation by the user 1 indicating a usage instruction. When the setting receiver 72 receives the operation area using request, the setting receiver 72 notifies the position specifying unit 73, the image pickup unit 74, and the detector 75 of a fact that the azimuth operation area using request is received. When the setting receiver 72 receives the operation area using request, the head mounted display 100 shifts to a home position usage mode. The home position usage mode means a mode for using (that is, displaying) the home position.

The position specifying unit 73 is a part configured to specify a position and a direction (that is, orientation) of the head mounted display 100. The position specifying unit 73 is realized by the sensor unit 150, for example. When the position specifying unit 73 receives, from the setting receiver 72, the fact that the operation area setting request described above is received or the fact that the operation area using request is received, the position specifying unit 73 specifies the position and the direction of the head mounted display 100. The position specifying unit 73 specifies the position and the direction of the head mounted display 100, and sends out the position and the direction thus specified to the setting unit 76. Further, in case of the home position usage mode, the position specifying unit 73 sends out the position and the direction thus specified to the application controller 77.

The image pickup unit 74 is a part configured to take an image of a site of the user 1 who wears the head mounted display 100. The image pickup unit 74 is realized by the first image pickup unit 133, the second image pickup unit 134, or the like. When the image pickup unit 74 receives notification that the operation area setting request is received from the setting receiver 72 or notification that the operation area using request is received, the image pickup unit 74 sends out a result of the taken image to the detector 75. For example, the image pickup unit 74 takes an image of a portion including the visible area described above, or takes an image around the eye of the user 1. The image pickup unit 74 sends out the result of the taken image to the detector 75.

The detector 75 is a part configured to detect a position indicated by the user 1 on the basis of the image taken by the image pickup unit 74. The detector 75 receives notification of reception of the operation area setting request from the setting receiver 72 or a fact that the operation area using request is received. When the result of the taken image is received from the image pickup unit 74, the detector detects the position indicated by the user 1.

In a case where the detector 75 obtains an image of a portion including the visible area from the image pickup unit 74 as the result of the taken image, the detector 75 subjects the image to a known image analyzing process to specify a motion of a finger included in the visible area. Namely, the detector 75 detects gesture of the user 1, and specifies a position based on the gesture.

For example, the detector 75 detects the gesture by the user 1, which indicates an area, from a result of the image taken by the image pickup unit 74, and specifies an area indicated by the detected result. The detector 75 detects the motion of the finger of the user 1, and specifies the position of the area (an operation area) based on the motion of the finger. The detector 75 sends out information indicating the position of the area to the setting unit 76. The information indicating the position of the area is information based on position specified by the finger, for example.

Further, in a case where the detector 75 obtains the taken image around the eye of the user 1 as the image result taken from the image pickup unit 74, the detector 75 subjects the image to the known image analyzing process to detect a position in front of a line of sight of the user 1. For example, the detector 75 detects a position in front of the line of sight on the see-through display 131 as the position in front of the line of sight of the user 1. In this case, the detector 75 sends out the information indicating the position to the setting unit 76 as information regarding the operation area.

The setting unit 76 is apart configured to set the information (for example, a position regarding the operation area) regarding the operation area (that is, the home position), which is an area for operating an application stored in the memory 71, on the basis of the result detected by the detector 75 and the position specified by the position specifying unit 73.

In a case where the setting unit 76 obtains the position and the direction specified by the position specifying unit 73 and the information indicating the area indicated by the result detected by the detector 75, the setting unit 76 sets, to the memory 71, the information indicating the area and the position and the direction specified by the position specifying unit 73.

The setting unit 76 sets, to the memory 71, the position and the direction specified by the position specifying unit 73, and the information on the area defined on the basis of the position in front of the line of sight by the result detected by the detector 75 or the position of the area based on the motion of the finger.

Further, in a case where the setting unit 76 specifies a monitor corresponding to the position based on the result detected by the detector 75, the setting unit 76 may set a position of the monitor to the position of the operation area. For example, the setting unit 76 obtains, from the image pickup unit 74, an image corresponding to the position detected by the detector 75 and compares the image with a template of the monitor stored in advance to detect the monitor, the setting unit 76 sets identification information of the monitor as the information regarding the operation area.

The application controller 77 is a part configured to display, in response to an operation request by the user 1, an application stored in the memory 71 in the operation area of the see-through display 131. In a case where an operation request for editing a predetermined application is made by the operation request by the user 1, the application controller 77 displays the application in the operation area, and sets the application to an editable state.

Further, in a case where information regarding the home position has already been stored in the memory 71, the application controller 77 appropriately obtains the position and the direction of the head mounted display 100 from the position specifying unit 73, and determines whether the home position is included in the visible area or not on the basis of the position and the direction. In a case where it is determined that the home position is included in the visible area, the application controller 77 outputs the area of the home position to the see-through display 131.

Further, in a case where the information regarding the operation area has already been set and the monitor corresponding to the position is specified, the application controller 77 resets the monitor to a position of a new operation area.

Further, the application controller 77 stores a display position of each of the applications, and displays the application on the basis of the corresponding display position. The display position is a position defined by a position, a direction, and the like of the user 1. Note that the memory 71 may store the display positions of the applications therein.

<Setting of Home Position>

Figure 5:
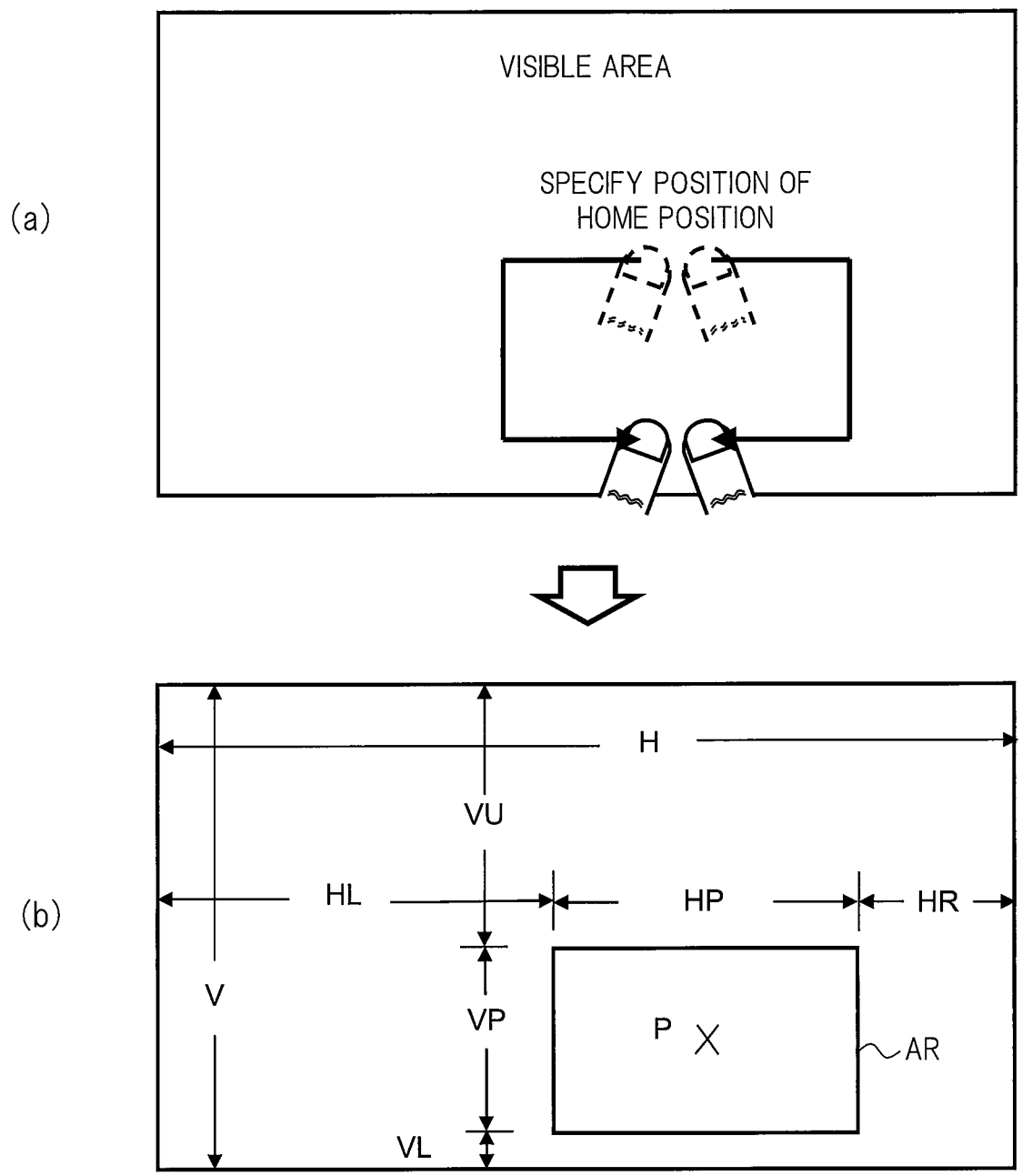
FIG. 5 is a view for explaining a method of setting a home position.

Subsequently, a method of setting a home position will be described with reference to FIG. 5. FIG. 5 is a view for explaining a method of setting a home position. As a premise, the head mounted display 100 becomes a setting mode for a home position on the basis of an operation received by the operation input unit 120.

When the head mounted display 100 becomes the setting mode for the home position as described above, the image pickup unit 74 takes an image of a visible area illustrated in FIG. 5(a) for a predetermined period, and takes an image of a finger of the user 1 as illustrated in FIG. 5(a). For example, the detector 75 detects a track of the finger from an upper central portion of a rectangular area to a lower central portion of the rectangular area.

Namely, the detector 75 detects a motion (gesture) of the finger as illustrated in FIG. 5(a) by using an image result taken by the image pickup unit 74; specifies a designation area (the rectangular area) by the user 1 on the basis of the motion of the finger; and sets the designation area as the home position. Moreover, the detector 75 determines a reference position of the home position on the basis of a difference between the visible area and an area of the see-through display 131.

For example, the detector 75 determines the reference position of the home position in the see-through display 131 on the basis of a positional relationship in the visible area and a difference in a size between the visible area and the area of the see-through display 131. Here, a method of determining the reference position described above will be described with reference to FIG. 5(b). FIG. 5(b) illustrates a display area in the see-through display 131.

Further, the detector 75 calculates a ratio among a height V, a distance VU, a distance VP, and a distance VL. The height V is a height of the see-through display 131. The distance VU is a distance from an upper portion of the see-through display 131 to an upper portion of the home position. The distance VP is a distance from the upper portion of the home position to a lower portion of the home position. The distance VL is a distance from the lower portion of the home position to a lower portion of the see-through display 131.

Further, the detector 75 calculates a ratio among a width H of the see-through display 131, a distance HL from a left portion of the see-through display 131 to a left portion of the home position, a distance HP from the left portion of the home position to a right portion of the home position, and a distance HR from the right portion of the home position to a right portion of the see-through display 131.

The detector 75 calculates a distance from the head mounted display 100 to a position of the finger, and defines a reference position P on the basis of the distance and the calculated ratio described above. This reference position P indicates a position to be displayed in the see-through display 131. By combining a current position and orientation specified by the position specifying unit 73, it is possible to define an absolute position of the home position in the external world. The absolute position in the external world obtained herein is basically the home position, but as a modification example, a specific position in the visible area illustrated in FIG. 5(b) may be set to the home position. In case of this modification example, it is possible for the user 1 to always recognize the home position visually.

Note that the detector 75 may specify the position in the specified area without considering the ratio as described above.

FIG. 5(a) illustrates the example in a case where a line from the upper central portion of the home position to the lower central portion of the home position is traced with the finger. However, the home position may be specified by another method. Here, another method of specifying a home position will be described with respect to FIG. 6. FIG. 6 is a view for explaining another method of specifying a home position. For example, as illustrated in FIG. 6(a), the home position may be specified along an area of the home position from an upper right portion of the home position to a lower left portion thereof. Further, as illustrated in FIG. 6(b), the home position may be specified along a diagonal line of the area of the home position by a line from the upper right portion of the home position to the lower left portion thereof.

Further, the detector 75 calculates a distance from the head mounted display 100 to a reference position of the home position on the basis of a result of the taken image. A method of calculating the distance from the head mounted display 100 to the home position will be described with reference to FIG. 7(a) and FIG. 7(b). FIG. 7 is a view for explaining the method of calculating the distance from the head mounted display 100 to the home position. FIG. 7(a) is a top view of the head mounted display 100 in a state where the user 1 wears the head mounted display 100, and is a view illustrating a horizontal angle. FIG. 7(b) is a side view of the head mounted display 100, and is a view illustrating an elevation/depression angle.

Specifically, the detector 75 calculates a horizontal angle α of a reference position of a home position AR with respect to orientation of the head mounted display 100 illustrated in FIG. 7(a) on the basis of a position of a finger of the taken image. Further, the detector 75 calculates an elevation/depression angle β of the reference position of the home position AR with respect to the orientation of the head mounted display 100 illustrated in FIG. 7(b) on the basis of the position of the finger of the taken image.

The detector 75 calculates a distance L to the reference position of the home position AR on the basis of a distance to a central portion of a taken image range, the horizontal angle α and the elevation/depression angle β described above.

Note that the detector 75 sends out, to the setting unit 76, the distance L from the head mounted display 100 to the reference position of the home position AR, a width and a height of the home position AR, and the reference position of the home position AR. In response to this, the setting unit 76 stores the distance L from the head mounted display 100 to the reference position of the home position AR, the width of the home position, the height of the home position, and the reference position P of the home position in the memory 71 as information regarding the home position. Note that needless to say, an absolute coordinate of the reference position P of the home position can be calculated from the position and the orientation of the head mounted display 100 obtained by the position specifying unit 73, and the horizontal angle α, the elevation/depression angle β, and the distance L described above.

Figure 8:
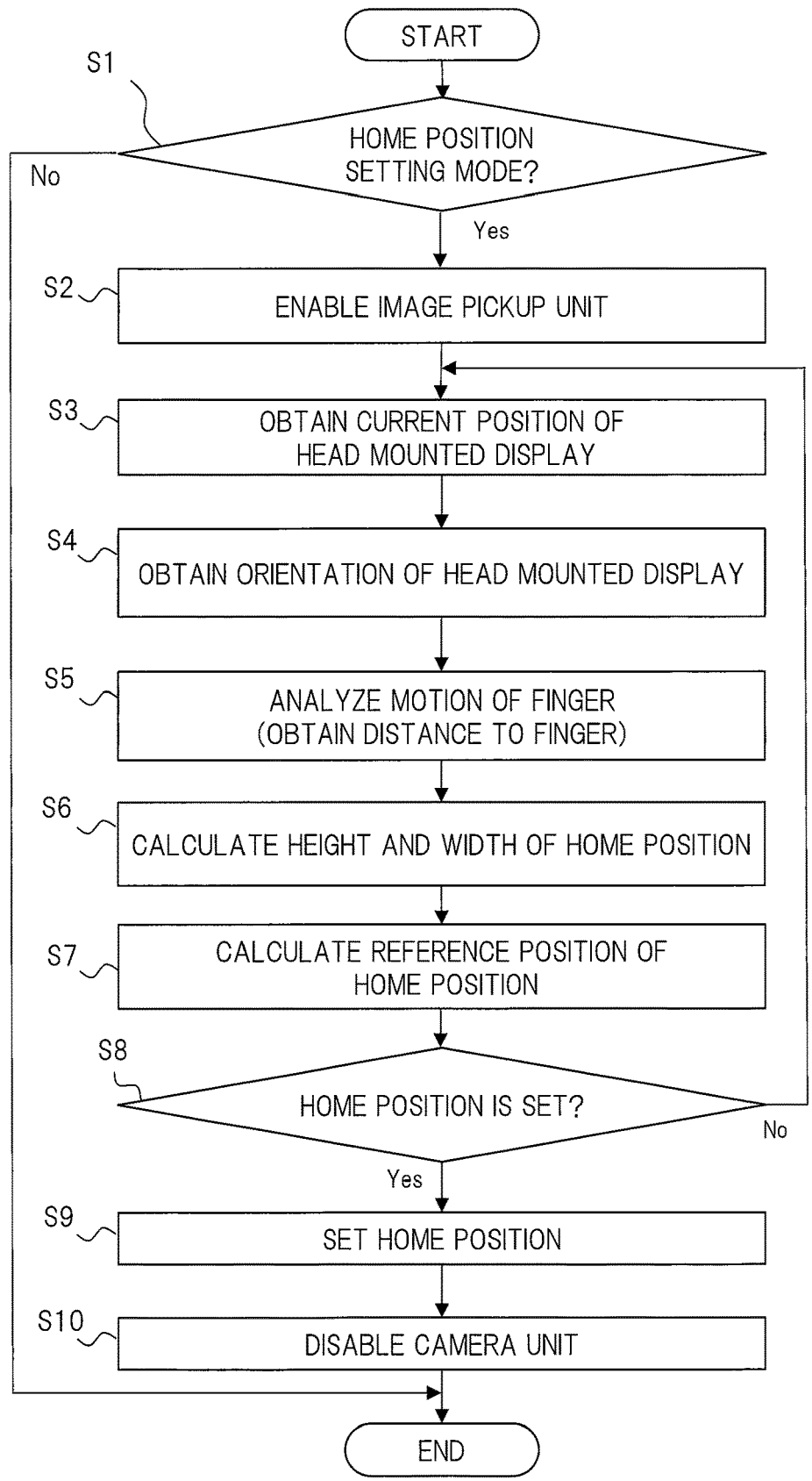
FIG. 8 is a flowchart illustrating a processing procedure for setting the home position.

Here, a procedure for setting the home position AR will be described with reference to FIG. 8. FIG. 8 is a flowchart illustrating a processing procedure for setting the home position AR. First, when the setting receiver 72 receives an operation area setting request in accordance with an operation by the user 1 indicating a setting request, the head mounted display 100 shifts to a home position setting mode (Step S1: Yes). Note that the processing is terminated in a case where the setting receiver 72 does not receive any operation area setting request (Step S1: No).

When the setting receiver 72 receives the operation area setting request, the setting receiver 72 notifies the position specifying unit 73, the image pickup unit 74, and the detector 75 of a fact that the operation area setting request is received. In response to this, the image pickup unit 74 starts (or enables) an image taking operation, and sends out a result of the taken image to the detector 75 (Step S2).

The position specifying unit 73 obtains a current position of the head mounted display 100 by the GPS receiver 151 or the like (Step S3). Further, the position specifying unit 73 obtains orientation (that is, a direction in which the head mounted display 100 is facing) by the geomagnetic sensor 153 or the like (Step S4). Further, the detector 75 obtains the result of the taken image from the image pickup unit 74; specifies a motion of the user 1 on the basis of the result of the taken image; and calculates a distance to a finger of the user 1 on the basis of the result of the taken image (Step S5). Further, the detector 75 specifies a height and a width of home position on the basis of the result of the taken image described above (Step S6). Further, the detector 75 calculates a reference position P on the basis of the distance to the finger of the user 1. The detector 75 sends out, to the setting unit 76, the distance L from the head mounted display 100 to the reference position of the home position AR, the width of the home position, the height of the home position, and the reference position P of the home position (Step S7).

When the setting unit 76 obtains the reference position P and the height and the width of the home position AR described above, the setting unit 76 displays a confirmation message of the home position AR on the see-through display 131, and confirms the setting (Step S8).

When an input indicating approval of the setting is made by an operational input by the user 1 (Step S8: Yes), the setting unit 76 sets the distance L, the height and the width of the home position AR, and the reference position P to the memory 71. Further, the setting unit 76 also sets the current position and the orientation specified by the position specifying unit 73 to the memory 71 as information regarding the home position AR (Step S9).

Further, the setting unit 76 notifies the image pickup unit 74 of that the setting is completed, and the image pickup unit 74 turns off (or disables) an image taking state (Step S10). Further, the setting unit 76 releases the home position setting mode. Note that when an input indicating denial of the setting is made at Step S8 by the operational input by the user 1 (Step S8: No), the processing flow shifts to Step S3.

Subsequently, a display example of the home position AR at the time of movement of the user 1 will be described with reference to FIG. 9 and FIG. 10. First, a state where the home position AR is set in the head mounted display 100 worn by the user 1 will be described with reference to FIG. 9. FIG. 9 is a view for explaining a state where the home position AR is set in the head mounted display 100 worn by the user 1.

FIG. 9(a) is a floor plan of a room of the user 1. As illustrated in FIG. 9(a), a bed 600, a desk 601, a chair 602, a book shelf 603, a TV stand 604, and a TV 605 are included in the room of the user 1.

FIG. 9(b) is a view illustrating a state where the user 1 is sitting on the chair 602. The user 1 wearing the head mounted display 100 operates the operation input unit 120 in a state of sitting on the chair 602, and the head mounted display 100 sets information regarding the home position AR in accordance with this.

Subsequently, a display control of the home position will be described with reference to FIG. 10. FIG. 10 is a view for explaining the display control of the home position AR. FIG. 10(a) is a view illustrating an example in which the user 1 is looking at a place different from the home position (that is, the head mounted display 100 is facing a direction different from the home position). As illustrated in FIG. 10(a), there is not the reference position P in the direction of the head mounted display 100 (that is, in a visible area), the head mounted display 100 does not display the home position AR.

Further, FIG. 10(b) illustrates an example in which the head mounted display 100 is facing a direction of the home position AR (that is, there is the reference position P in the visible area). As illustrated in FIG. 10(b), in a case where the head mounted display 100 faces the direction of the home position AR, the reference position P is included in the visible area. Therefore, the head mounted display 100 displays the home position AR. A display mode of the home position at this time may be configured so that the direction at the time of the setting is maintained, or may be configured so that the direction is changed into a direction of the user 1.

Figure 11:
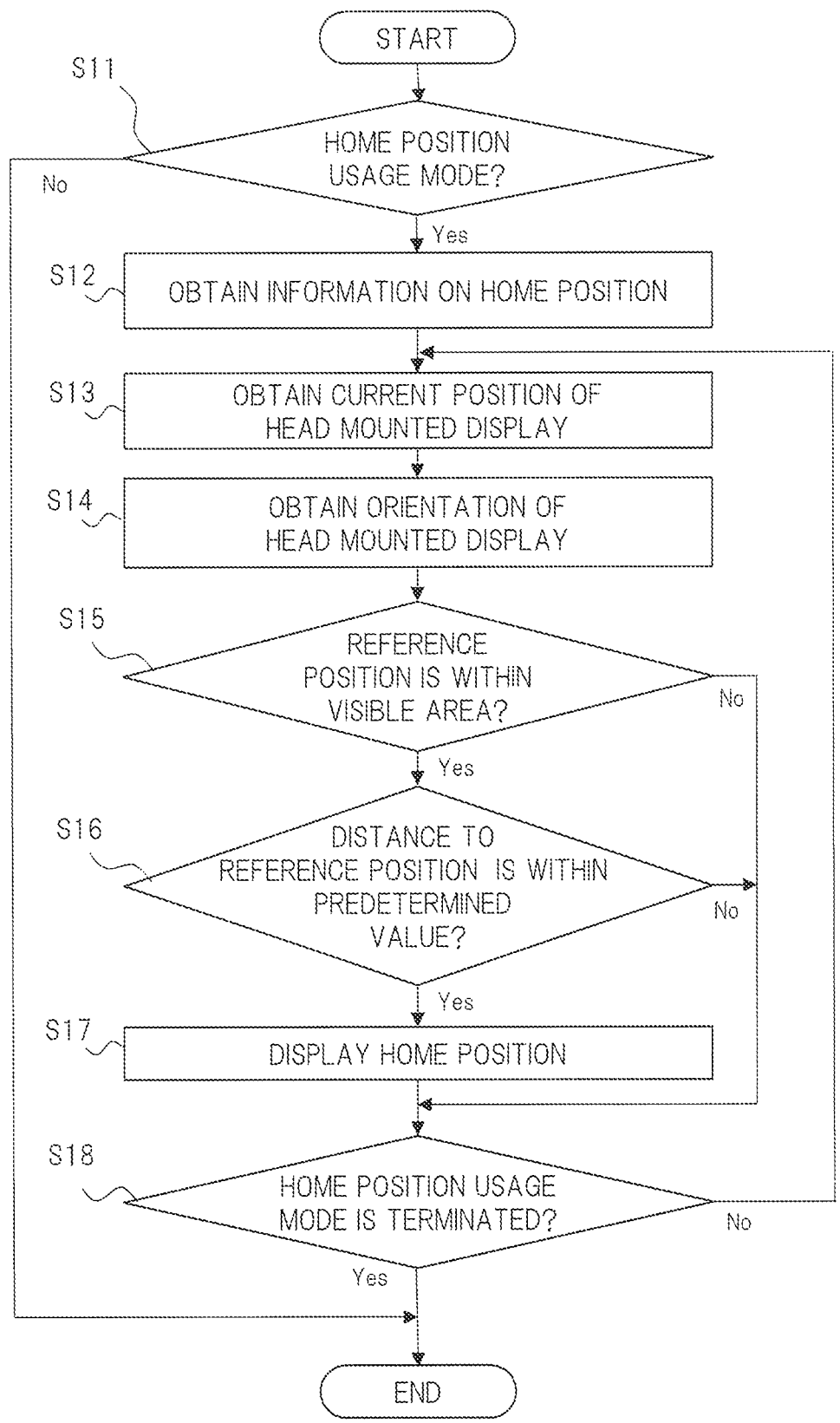
FIG. 11 is a flowchart illustrating a process for controlling display of the home position.

Subsequently, a processing procedure for controlling display of the home position AR will be described with reference to FIG. 11. FIG. 11 is a flowchart illustrating a process of controlling display of the home position AR. In a case where a home position usage mode is specified by an operational input of the user 1 (Step S11: Yes), the application controller 77 obtains information regarding the home position AR stored in the memory 71 (containing a current position, orientation, a distance L, a width and a height of a home position, and a reference position P) (Step S12).

Subsequently, the application controller 77 obtains information on a current position from the position specifying unit (Step S13). Further, the application controller 77 obtains orientation from the position specifying unit 73 (Step S14).

The application controller 77 compares the information regarding the home position AR stored in the memory 71 with the information on the current position and the orientation specified by the position specifying unit 73. In a case where the reference position P of the home position is within a visible area as a result of the comparison (Step S15: Yes) and a distance from the head mounted display 100 to the reference position P of the home position is within a predetermined value (Step S16: Yes), the application controller 77 displays the home position on the see-through display 131 (Step S17). Note that in a case where the condition at Step S15 is not satisfied (Step S15: No) or the condition at Step S16 is not satisfied (Step S16: No), the processing flow proceeds to Step S18.

<Movement of Application to Home Position>

Subsequently, a method of moving an application displayed by the head mounted display 100 to a home position will be described with reference to FIG. 12 to FIG. 17.

A display example of the home position at the time of setting the home position will first be described with reference to FIG. 12. FIG. 12 is a view for explaining a display example of the home position when the home position is set. FIG. 12(a) is a view illustrating a state where the user 1 is sitting on the chair 602. In this state, the head mounted display 100 sets the home position in response to an operation request from the user 1.

FIG. 12(b) is an example of an image displayed on the see-through display 131 of the head mounted display 100 in this state. As illustrated in FIG. 12(b), the head mounted display 100 displays an application AP1 (an application A) and an application AP2 (an application B), and further displays the home position on the see-through display 131.

Subsequently, FIG. 13 illustrates an example in a case where the head mounted display 100 is facing a direction different from that of the home position. FIG. 13(a) is a view illustrating an example in which the head mounted display 100 is facing the direction different from that of the home position. FIG. 13(b) is a view illustrating an example of an image displayed on the see-through display 131 of the head mounted display 100 in the state illustrated in FIG. 13(a).

As illustrated in FIG. 13(b), the head mounted display 100 does not display the home position, but displays, on the see-through display 131, an application AP3 (an application C), an application AP4 (an application D), an application AP5 (an application E), an application AP6 (an application F), which are assigned into the direction.

Figure 14:
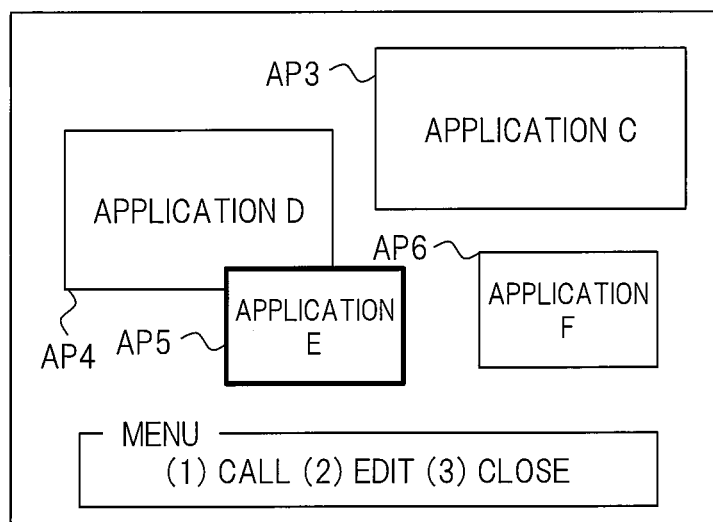
FIG. 14 is a view illustrating an example in which the head mounted display moves an application to the home position.

Subsequently, FIG. 14 illustrates an example in which the head mounted display 100 moves the application to the home position. As illustrated in FIG. 14, when the application AP5 is selected in the state illustrated in FIG. 13(b) by an operational input by the user 1, the head mounted display 100 displays a menu. In this menu, "call" is selected. This "call" is a menu indicating invoke or call a target to the home position.

A state after the "call" is selected in the menu will be described with reference to FIG. 15. As illustrated in FIG. 15(a), a direction that the user 1 is facing does not change as well as that in FIG. 13(a). FIG. 15(b) is a view illustrating a display state of the see-through display 131 after the menu is selected. As illustrated in FIG. 15(b), the application AP5 that has been selected and to which the "call" is specified moves to the home position. Therefore, the application AP5 is excluded from display targets. In this case, the application controller 77 stores a position before movement and a position after movement of the application AP5. Note that after the application AP5 is called, the head mounted display 100 may display a portion of the application AP5 before movement with a lighter color than that before movement. This makes it possible for the user 1 to visually recognize the position of the application AP5 before movement, and the user 1 can refer to the position when a display position of an application is adjusted in this area of the application AP5 before movement.

Subsequently, a case where the user 1 faces a direction in which the home position is positioned will be described with reference to FIG. 16. FIG. 16(a) is a view illustrating a state where the user 1 changes his or her posture and the head mounted display 100 faces a direction in which the home position is included in the visible area.

FIG. 16(b) is a view illustrating an example of an image displayed on the see-through display 131 of the head mounted display 100 in the state described above. As illustrated in FIG. 16(b), the application controller 77 arranges and displays the application AP5 at a position within the home position AR. Further, in a case where the application controller 77 receives a menu display request for the application AP5 by an input operation of the user 1, the application controller 77 displays the menu. When "return" is selected, the application controller 77 excludes the application AP5 from the display targets.

Subsequently, a case where the user 1 faces a left direction again will be described with reference to FIG. 17. FIG. 17(a) is a view illustrating a state where the user 1 changes his or her posture and the head mounted display 100 faces the left direction. FIG. 17(b) is a view illustrating an example of an image displayed on the see-through display 131 of the head mounted display 100 in the state described above.

As illustrated in FIG. 17(b), the application controller 77 displays the application AP5 so as to be returned to an original position thereof in a case where "return" for the application AP5 is selected from the menu.

Figure 18:
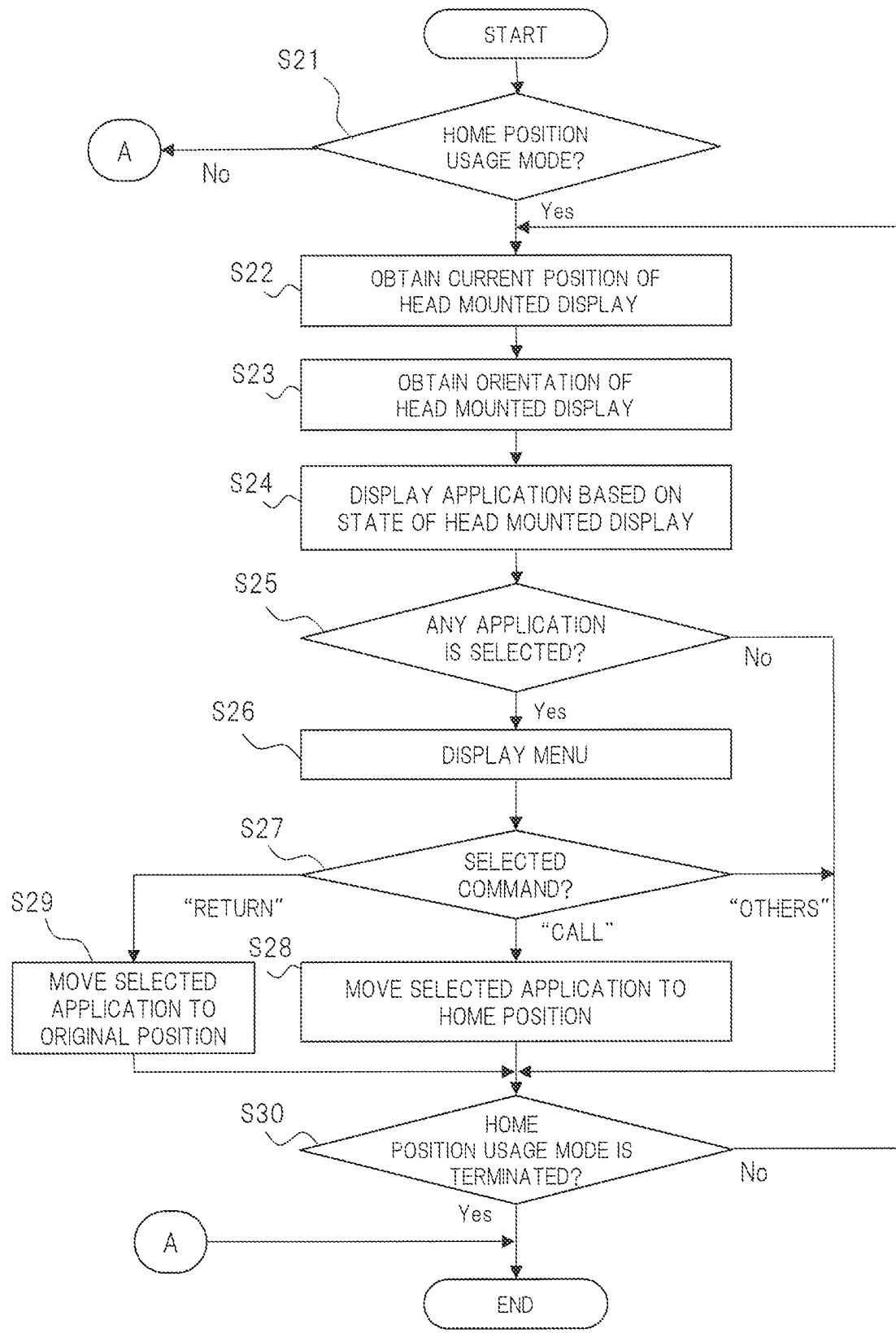
FIG. 18 is a flowchart illustrating a processing procedure for a display control of the application.

Subsequently, a processing procedure for a display control of an application will be described with reference to FIG. 18. FIG. 18 is a flowchart illustrating a processing procedure for a display control of an application. First, in a case where the head mounted display 100 is in the home position usage mode (Step S21: Yes), the position specifying unit 73 obtains a current position of the head mounted display 100 (Step S22). Further, the position specifying unit 73 obtains orientation thereof (Step S23). The application controller 77 obtains the current position and the orientation described above from the position specifying unit 73, and displays an application based on the current position and the orientation on the basis of a stored display position of the application (Step S24).

In a case where the application controller 77 detects that any application is selected (Step S25: Yes), the application controller 77 displays a menu (Step S26). The application controller 77 specifies a selected command (Step S27). In a case where the specified command is "return", the application controller 77 causes the selected application to move to an original position (Step S29), the processing flow proceeds to Step S30. Further, in a case where the specified command is "call", the application controller 77 moves the selected application to the home position (Step S28), the processing flow proceeds to Step S30. Further, in a case where the application controller 77 selects a menu other than "call" and "return", the processing flow proceeds to Step S30 without executing anything. At Step S30, in a case where an instruction indicating termination of the home position usage mode is not made (Step S30: No), the processing flow proceeds to Step S22. Further, in a case where the instruction indicating termination of the home position is made at Step S30 (Step S30: Yes), the processing procedure is terminated.

<Process of Linking to Monitor>

Subsequently, an example of linking the monitor to the home position AR in a case where there is the monitor at a position of the home position AR will be described. An example in which the home position AR is set will first be described. FIG. 19(a) is a view illustrating a state where the user 1 is sitting on the chair 602. The user 1 who wears the head mounted display 100 operates the operation input unit 120 in a state of sitting on the chair 602, the home position AR is set in response to this. FIG. 19(b) is a view illustrating an example of an image displayed on the see-through display 131 of the head mounted display 100 in the state described above. As illustrated in FIG. 19(b), the application controller 77 displays the home position AR on the see-through display 131.

Subsequently, an example of resetting the monitor 700 as the home position AR in a case where a monitor 700 is arranged at a position of the home position AR will be described with reference to FIG. 20.

FIG. 20(a) is a view illustrating an example in which the monitor is arranged in front of the user 1 in a state where the user 1 is sitting on the chair 602.

In such a state, the application controller 77 determines whether the monitor is arranged in a range of the home position or not. For example, the application controller 77 compares a result of an image taken by the image pickup unit 74 with the template of the monitor stored in advance to determine whether the monitor exists or not.

In a case where it is determined that the monitor exists, the application controller 77 displays a message for inquiring whether to be connected to the monitor or not on the see-through display 131. When an operational input of the user 1 is made to connect to the monitor, the application controller 77 executes near field communication with the monitor. When the monitor is set to a state where information can be transmitted to or received from the monitor, the application controller 77 obtains identification information of the monitor, and adds the identification information of the monitor as information regarding the home position AR. In this way, the application controller 77 serves as a setting modifier.

Then, as illustrated in FIG. 20(b), the application controller 77 displays the monitor as the home position AR. Further, as a modification example, in a case where the monitor 700 can be visually recognized in the visible area, a method of setting a screen of the monitor 700 as a new home position may be adopted. In that case, it may be possible to return to an original home position setting that is not linked to the monitor if necessary.

Figure 21:
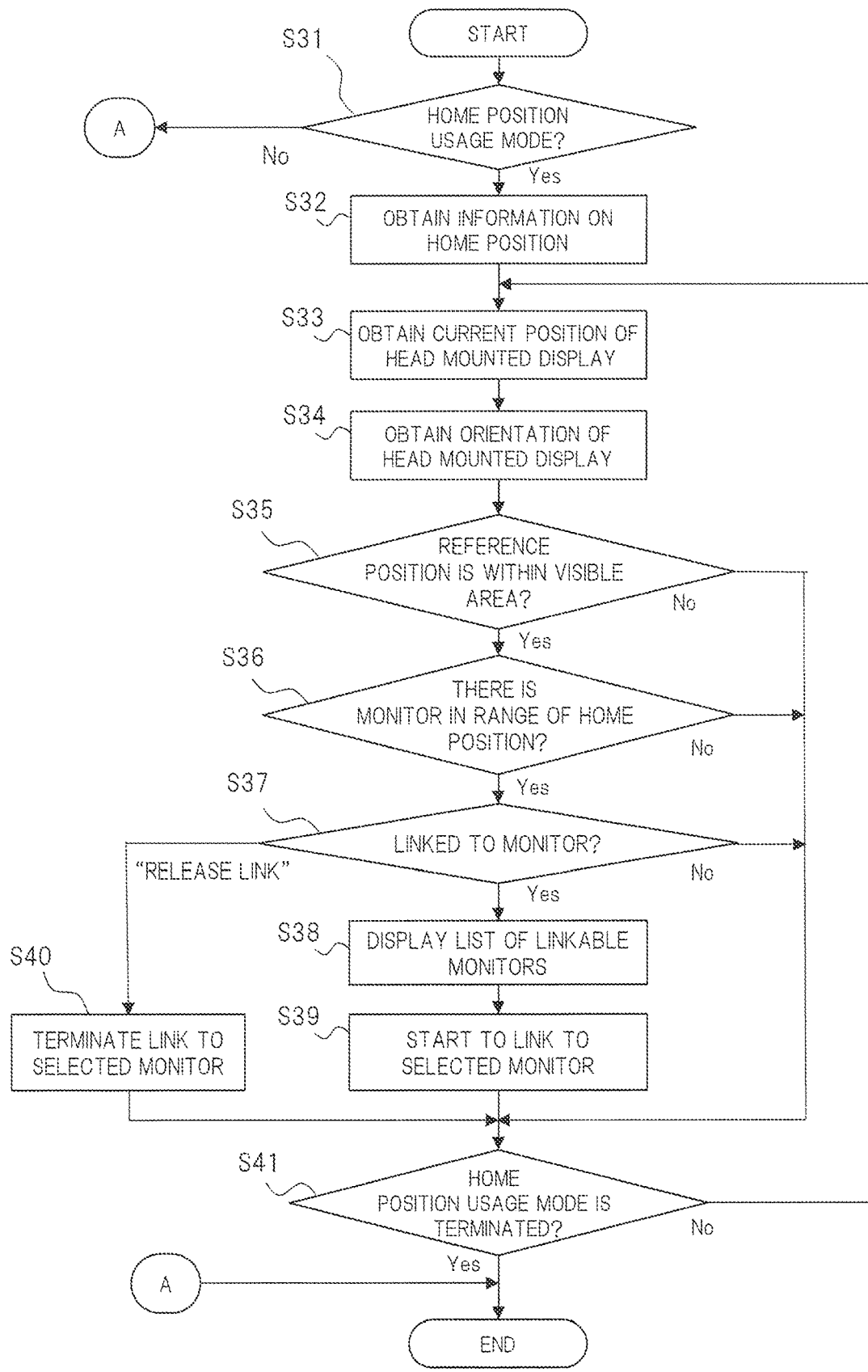
FIG. 21 is a flowchart illustrating a processing procedure for linking the home position to the monitor.

Subsequently, a processing procedure for linking the home position AR to the monitor will be described with reference to FIG. 21. FIG. 21 is a flowchart illustrating a processing procedure for linking the home position AR to the monitor 700. Since Steps S31 to Step S35 illustrated in FIG. 21 are respectively the same as Steps S11 to Step S15 illustrated in FIG. 11, their explanation is omitted.

At Step S36, the application controller 77 compares a result of an image taken by the image pickup unit 74 with a template of the monitor 700 stored in advance to determine whether the monitor 700 exists in a range of the home position or not (Step S36). In a case where it is determined that the monitor 700 exists in the range of the home position AR (Step S36: Yes), the application controller 77 outputs a message for inquiring whether to link with the monitor 700 or not (Step S37). In a case where link release is specified by a user operation, the application controller 77 releases link with the monitor 700 (Step S40), the processing flow proceeds to Step S41. Note that in a case where it is determined that the monitor 700 does not exist in the range of the home position AR (Step S36: No), the processing flow proceeds to Step S41.

At Step S37, in a case where a user operation for linking with the monitor is made (Step S37: Yes) and there is a plurality of linkable monitors 700, the application controller 77 displays a list of the monitors 700, and receives selection of any monitor 700 (Step S38). Note that in a case where there is only one monitor 700, the process at Step S38 may be omitted. The application controller 77 links with the selected monitor 700 (resets the home position to the monitor) (Step S39), the processing flow proceeds to Step S41.

At Step S41, in a case where an instruction for terminating the home position usage mode is made (Step S41: Yes), the processing procedure is terminated. Further, in a case where no instruction for terminating the home position usage mode is made at Step S41 (Step S41: No), the processing flow proceeds to Step S33.

Figure 22:
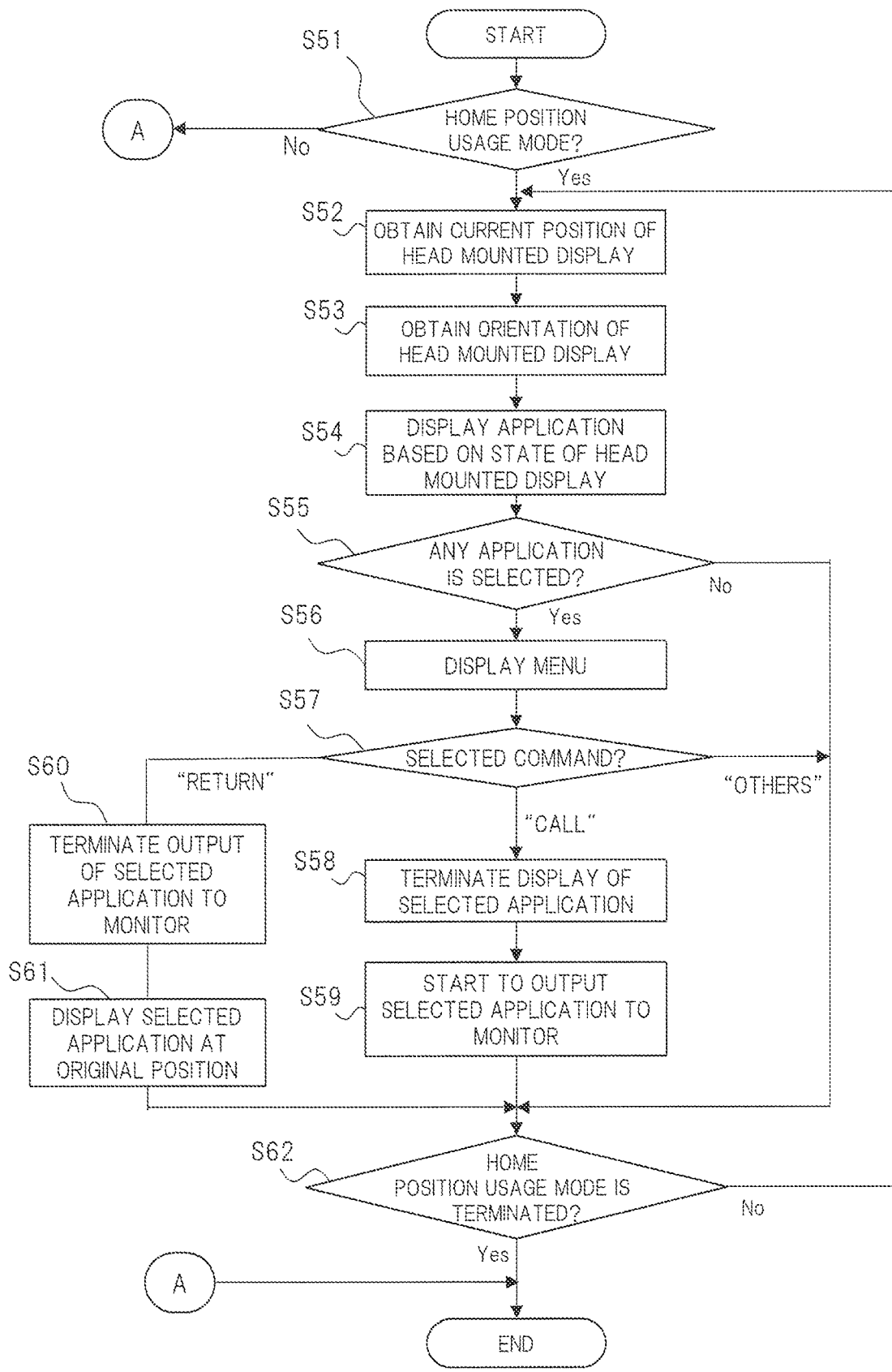
FIG. 22 is a flowchart illustrating a processing procedure for a display control of an application in a case where the monitor is set to the home position.

Subsequently, a processing procedure of a display control of the application in a case where the monitor 700 is set to the home position will be described with reference to FIG. 22. FIG. 22 is a flowchart illustrating a processing procedure of a display control of the application in a case where the monitor 700 is set to the home position AR. Note that since Step S51 to Step S57, and Step S62 illustrated in FIG. 22 are respectively the same as Step S21 to Step S27, and Step S30 illustrated in FIG. 18, their explanation is omitted.

At Step S57, in a case where the specified command is "return", there is no target to be displayed on the monitor 700. Therefore, the application controller 77 terminates an output of a selected application to a monitor (Step S60); move the application to an original position (Step S61); and the processing flow proceeds to Step S62.

Further, at Step S57, in a case where the specified command is "call", the application controller 77 terminates display of the selected application (Step S58) and displays the application on the monitor 700 that is the home position (Step S59), and the processing flow proceeds to Step S62. Further, in a case where any menu other than "call" and "return" is selected, the application controller 77 causes the processing flow to proceed to Step S62 without doing anything.

As described above, in the head mounted display 100, the memory 71 stores applications therein. The image pickup unit 74 takes an image of a site of the user 1, and the position specifying unit 73 specifies the position and the direction of the head mounted display 100. The detector 75 detects a state of the user 1 on the basis of the image taken by the image pickup unit 74, and the setting unit 76 sets a position indicating the home position on the basis of the result detected by the detector 75 and the position and the direction specified by the position specifying unit 73.

The head mounted display 100 sets the area where the application is operated by means of input specification of the user 1. Therefore, the user 1 can operate the application at a position where the user 1 can operate the application easily.

Specifically, the image pickup unit 74 takes an image of a portion including the finger of the user 1; the detector 75 detects gesture of the user 1 on the basis of the result of the taken image; and the setting unit 76 sets a position regarding the home position by using the position by the gesture. In this case, the head mounted display 100 sets the position regarding the home position on the basis of a result of a finger motion (or gesture) of the user 1. Therefore, it is possible to set the home position by an intuitive and simple operation without using a complicated operational input.

Further, the image pickup unit 74 takes the image around the eye of the user 1; the detector 75 detects the line of sight of the user by using the image result taken by the image pickup unit 74, and detects the position by the line of sight; and the setting unit 76 sets the position regarding the home position by using the position by the line of sight. In this case, the head mounted display 100 can also set the home position by the intuitive and simple operation without using a complicated operational input.

Further, in a case where there is the monitor 700 at the position based on the position detected by the detector 75 and the position specified by the position specifying unit 73, the setting unit 76 sets the position of the monitor 700 at the position regarding the home position AR. In this case, the head mounted display 100 can sets the monitor 700 as the home position AR by an intuitive operation such as the gesture of the user 1.

Further, in a case where the position regarding the home position AR is set by the setting unit 76 and the application controller 77 newly specifies the monitor 700 at a position corresponding to the position, the application controller 77 newly resets the position of the monitor as the home position. As a result, after setting the home position, the head mounted display 100 can set the position of the monitor to the home position without requiring an operation indicating specification of a new position by the user 1.

Further, the application controller 77 controls, in response to a predetermined input operation, so that the application stored in the memory 71 is displayed at the home position, whereby it is possible to display the application at a position where the user operates the application easily.

Although it has not been mentioned particularly in the embodiment described above, a plurality of home positions may be set. Further, in this case, a home position as a target may be determined on the basis of a current position of the head mounted display 100, or a home position specified by a user operation may be prioritized.

The case where the position specifying unit 73 specifies the position on the basis of the current position such as latitude or longitude has been described. However, the position may be specified by any of various kinds of other methods. For example, a relative position based on a reference object (an object that becomes a landmark) may be specified.

Although it has not mentioned particularly in the embodiment described above, command specification (for example, "call" or the like) may be specified by an audio input.

In the embodiment described above, the case where the distance L, the width and the height of the home position, and the reference position P are set as the information regarding the home position in addition to the current position and the orientation has been described. However, with respect to the distance L, and the width and the height of the home position, values defined in advance may be held, and the current position, the orientation, and the reference position P may be set.

A part or all of the functions and the like described above of the present invention may be realized by hardware that is designed by an integrated circuit, for example. Further, the functions and the like may also be realized by software so that a microprocessor unit or the like interprets operation programs realizing the respective functions and executes the interpreted operation programs. Hardware and software may be used together.

Further, control lines and information lines illustrated in figures are illustrated so long as they are thought to be necessary for explanation. All of the control lines and the information line are not necessarily illustrated on a product. In fact, it may be considered that almost all of the components are connected to each other.

Further, control lines and information lines illustrated in figures are illustrated so long as they are thought to be necessary for explanation. All of the control lines and the information line are not necessarily illustrated on a product. In fact, it may be considered that almost all of the components are connected to each other.

REFERENCE SINGS LIST

1 . . . user, 71 . . . memory, 72 . . . setting receiver, 73 . . . position specifying unit, 74 . . . image pickup unit, 75 . . . detector, 76 . . . setting unit, 77 . . . application controller, 100 . . . head mounted display, 101 . . . main controller, 103 . . . RAM, 110 . . . storage, 120 . . . operation input unit, 121 . . . operation keys, 122 . . . touch sensor, 131 . . . see-through display, 132 . . . image signal processor, 133 . . . first image pickup unit, 134 . . . second image pickup unit, 141 . . . audio output unit, 142 . . . audio signal processor, 143 . . . audio input unit, 150 . . . sensor unit, 151 . . . GPS receiver, 152 . . . gyro sensor, 153 . . . geomagnetic sensor, 154 . . . acceleration sensor, 160 . . . communication unit, and 170 . . . extension I/F unit.

The invention claimed is:

1. A head mounted display capable of visually recognizing an application arranged at an arbitrary position in a virtual space, the head mounted display comprising:
   an image pickup unit configured to take an image of a site of a user who wears the head mounted display in a real space;
   a detector configured to detect a position in the real space indicated by the user on a basis of the image taken by the image pickup unit;
   a position specifying unit configured to specify a position and a direction of the head mounted display in the real space; and
   a setting unit configured to set an operation area at a predetermined positon in the virtual space corresponding to a position in the real space determined on a basis of a result detected by the detector and the position and the direction specified by the position specifying unit, the operation area being an area where the user operates the application,
   wherein the operation area is set as an area of a destination of the application when a request for editing the application arranged at the arbitrary position in the virtual space is indicated by the user.

2. The head mounted display according to claim 1, wherein the image pickup unit is configured to take an image of a finger of the user, and
   wherein the detector is configured to detect a position indicated by gesture of the finger of the user on the basis of the image taken by the image pickup unit.

3. The head mounted display according to claim 1, wherein the image pickup unit is configured to take an image around an eye of the user, and
   wherein the detector is configured to detect a position indicated by a line of sight of the user on a basis of the image taken by the image pickup unit.

4. The head mounted display according to claim 1, wherein, in a case where a display device is located in a range of the position in the real space determined on the basis of the result detected by the detector and the position and the direction specified by the position specifying unit, the setting unit is configured to set a display of the display device as the operation area.

5. The head mounted display according to claim 1, further comprising:

a setting modifier configured to reset, in a case where the operation area is set by the setting unit and a display device is located in a range of the position in the real space determined on the basis of the result detected by the detector and the position and the direction specified by the position specifying unit, display of the display device as a new operation area.

6. The head mounted display according to claim 1, further comprising:

an application controller configured to select an application arranged at an arbitrary position in the virtual space in response to a predetermined input operation by the user, and display the selected application after an arrangement position of the selected application is changed into the operation area.

7. The head mounted display according to claim 6, wherein the application controller is further configured to select an application arranged in the operation area in response to a predetermined input operation by the user against the application, and display the selected application after an arrangement position of the selected application is returned to an arbitrary position in the virtual space where the application was originally arranged.

8. A setting method executed by a head mounted display, the head mounted display capable of visually recognizing an application arranged at an arbitrary position in a virtual space, the setting method comprising:

an image pickup step of taking an image of a site of a user, the user wearing the head mounted display in the real space;

a detection step of detecting a position in the real space indicated by the user, who wears the head mounted display, on a basis of the image taken in the image pickup step;

a position specification step of specifying a position and a direction of the head mounted display in the real space; and a set step of setting an operation area at a predetermined position in the virtual space corresponding to a position in the real space determined on a basis of a result detected in the detection step and the position and the direction specified in the position specification step, the operation area being an area where the user operates the application, wherein the operation area set in the set step is set as an area of a destination of the application when a request for editing the application arranged at the arbitrary position in the virtual space is indicated by the user.

* * * * *